(12) United States Patent
Venkataraman et al.

(10) Patent No.: US 7,901,814 B2
(45) Date of Patent: Mar. 8, 2011

(54) HIGH TEMPERATURE FUEL CELL SYSTEM AND METHOD OF OPERATING SAME

(75) Inventors: Swaminathan Venkataraman, Cupertino, CA (US); Matthias Gottmann, Sunnyvale, CA (US); John Finn, Mountain View, CA (US)

(73) Assignee: Bloom Energy Corporation, Sunnyvale, CA (US)

( * ) Notice: Subject to any disclaimer, the term of this patent is extended or adjusted under 35 U.S.C. 154(b) by 0 days.

(21) Appl. No.: 12/765,732

(22) Filed: Apr. 22, 2010

(65) Prior Publication Data

US 2010/0203417 A1    Aug. 12, 2010

Related U.S. Application Data

(62) Division of application No. 12/222,712, filed on Aug. 14, 2008, now Pat. No. 7,704,618, which is a division of application No. 11/002,681, filed on Dec. 3, 2004, now Pat. No. 7,422,810.

(60) Provisional application No. 60/537,899, filed on Jan. 22, 2004, provisional application No. 60/552,202, filed on Mar. 12, 2004.

(51) Int. Cl.
 *H01M 8/04* (2006.01)
 *H01M 8/00* (2006.01)
 *H01M 8/10* (2006.01)
 *H01M 8/12* (2006.01)
 *H01M 8/18* (2006.01)

(52) U.S. Cl. ......... 429/410; 429/420; 429/425; 429/434; 429/454; 429/495

(58) Field of Classification Search .............. None
 See application file for complete search history.

(56) References Cited

U.S. PATENT DOCUMENTS

| | | | |
|---|---|---|---|
| 3,488,266 | A | 1/1970 | French |
| 3,718,506 | A | 2/1973 | Fischer et al. |
| 4,041,210 | A | 8/1977 | Van Dine |
| 4,182,795 | A | 1/1980 | Baker et al. |
| 4,532,192 | A | 7/1985 | Baker et al. |
| 4,622,275 | A | 11/1986 | Noguchi et al. |
| 4,792,502 | A | 12/1988 | Trocciola et al. |
| 4,898,792 | A | 2/1990 | Singh et al. |
| 4,917,971 | A | 4/1990 | Farooque |
| 4,983,471 | A | 1/1991 | Reichner et al. |
| 5,034,287 | A | 7/1991 | Kunz |
| 5,047,299 | A | 9/1991 | Shockling |
| 5,079,105 | A | 1/1992 | Bossel |

(Continued)

FOREIGN PATENT DOCUMENTS

EP    0 398 111 A1    11/1990

(Continued)

OTHER PUBLICATIONS

Office Action mailed Jun. 25, 2009 in U.S. Appl. No. 11/124,120.

(Continued)

*Primary Examiner* — Robert Hodge
(74) *Attorney, Agent, or Firm* — The Marbury Law Group PLLC

(57) ABSTRACT

A high temperature fuel cell stack system, such as a solid oxide fuel cell system, with an improved balance of plant efficiency includes a thermally integrated reformer, combustor and the fuel cell stack.

19 Claims, 9 Drawing Sheets

U.S. PATENT DOCUMENTS

| | | | |
|---|---|---|---|
| 5,084,362 A | 1/1992 | Farooque | |
| 5,143,800 A | 9/1992 | George et al. | |
| 5,169,730 A | 12/1992 | Reichner et al. | |
| 5,170,124 A | 12/1992 | Blair et al. | |
| 5,302,470 A | 4/1994 | Okada et al. | |
| 5,366,819 A | 11/1994 | Hartvigsen et al. | |
| 5,441,821 A | 8/1995 | Merritt et al. | |
| 5,498,487 A | 3/1996 | Ruka et al. | |
| 5,501,914 A | 3/1996 | Satake et al. | |
| 5,505,824 A | 4/1996 | McElroy | |
| 5,527,631 A | 6/1996 | Singh et al. | |
| 5,573,867 A | 11/1996 | Zafred et al. | |
| 5,601,937 A | 2/1997 | Isenberg | |
| 5,686,196 A | 11/1997 | Singh et al. | |
| 5,733,675 A | 3/1998 | Dederer et al. | |
| 5,741,605 A | 4/1998 | Gillett et al. | |
| 5,763,114 A | 6/1998 | Khandkar et al. | |
| 5,914,200 A | 6/1999 | Schabert et al. | |
| 5,955,039 A | 9/1999 | Dowdy | |
| 6,013,385 A | 1/2000 | DuBose | |
| 6,051,125 A | 4/2000 | Pham et al. | |
| 6,280,865 B1 | 8/2001 | Eisman et al. | |
| 6,329,090 B1 | 12/2001 | McElroy et al. | |
| 6,348,278 B1 | 2/2002 | LaPierre et al. | |
| 6,403,245 B1 | 6/2002 | Hunt et al. | |
| 6,436,562 B1 | 8/2002 | Dubose | |
| 6,451,466 B1 | 9/2002 | Grasso et al. | |
| 6,514,634 B1 | 2/2003 | Rush, Jr. | |
| 6,531,243 B2 | 3/2003 | Thom | |
| 6,623,880 B1 | 9/2003 | Geisbrecht et al. | |
| 6,641,084 B1 * | 11/2003 | Huber et al. | 244/48 |
| 6,749,958 B2 | 6/2004 | Pastula et al. | |
| 6,821,663 B2 | 11/2004 | McElroy et al. | |
| 7,364,810 B2 | 4/2008 | Sridhar et al. | |
| 7,482,078 B2 | 1/2009 | Sridhar et al. | |
| 2001/0049035 A1 | 12/2001 | Haltiner et al. | |
| 2002/0004154 A1 | 1/2002 | Pastula et al. | |
| 2002/0025463 A1 | 2/2002 | Derflinger et al. | |
| 2002/0028362 A1 | 3/2002 | Prediger et al. | |
| 2002/0058175 A1 | 5/2002 | Ruhl | |
| 2002/0106544 A1 | 8/2002 | Noetzel et al. | |
| 2002/0172846 A1 | 11/2002 | Hagan et al. | |
| 2003/0031904 A1 | 2/2003 | Haltiner, Jr. | |
| 2003/0049502 A1 | 3/2003 | Dickman et al. | |
| 2003/0157386 A1 | 8/2003 | Gottmann et al. | |
| 2003/0162067 A1 | 8/2003 | McElroy | |
| 2003/0196893 A1 | 10/2003 | McElroy et al. | |
| 2003/0205641 A1 | 11/2003 | McElroy et al. | |
| 2004/0089438 A1 | 5/2004 | Valensa et al. | |
| 2004/0131912 A1 | 7/2004 | Keefer et al. | |
| 2004/0191597 A1 | 9/2004 | McElroy | |
| 2004/0224193 A1 | 11/2004 | Mitlitsky et al. | |
| 2004/0229102 A1 | 11/2004 | Jahnke et al. | |
| 2005/0221137 A1 | 10/2005 | Bandhauer et al. | |

FOREIGN PATENT DOCUMENTS

| | | |
|---|---|---|
| EP | 0 977 294 B1 | 2/2000 |
| WO | WO-94/18712 | 8/1994 |
| WO | WO-2004/021497 A2 | 3/2004 |
| WO | WO-2004/027912 A2 | 4/2004 |
| WO | WO-2004/093214 | 10/2004 |

OTHER PUBLICATIONS

Office Action received in U.S. Appl. No. 11/124,817 dated Jan. 26, 2009.

Office Action received in U.S. Appl. No. 11/124,817 dated Sep. 21, 2009.

Supplementary European Search Report with written search opinion mailing date of May 29, 2009 for European Application No. 06759276.

* cited by examiner

HIGH TEMPERATURE FUEL CELL SYSTEM AND METHOD OF OPERATING SAME

This application is a divisional application of U.S. application Ser. No. 12/222,712, filed Aug. 14, 2008, which is a divisional of U.S. application Ser. No. 11/002,681, filed Dec. 3, 2004, which claims the benefit of priority of U.S. provisional applications 60/537,899 filed on Jan. 22, 2004 and 60/552,202 filed on Mar. 12, 2004, all of which are incorporated herein by reference in their entirety.

BACKGROUND OF THE INVENTION

The present invention is generally directed to fuel cells and more specifically to high temperature fuel cell systems and their operation.

Fuel cells are electrochemical devices which can convert energy stored in fuels to electrical energy with high efficiencies. High temperature fuel cells include solid oxide and molten carbonate fuel cells. These fuel cells may operate using hydrogen and/or hydrocarbon fuels. There are classes of fuel cells, such as the solid oxide regenerative fuel cells, that also allow reversed operation, such that oxidized fuel can be reduced back to unoxidized fuel using electrical energy as an input.

BRIEF SUMMARY OF THE INVENTION

The preferred aspects of present invention provide a high temperature fuel system, such as a solid oxide fuel cell system, with an improved balance of plant efficiency. The system includes a thermally integrated unit including a reformer, combustor and the fuel cell stack.

DETAILED DESCRIPTION OF THE PREFERRED EMBODIMENTS

Figure 1:
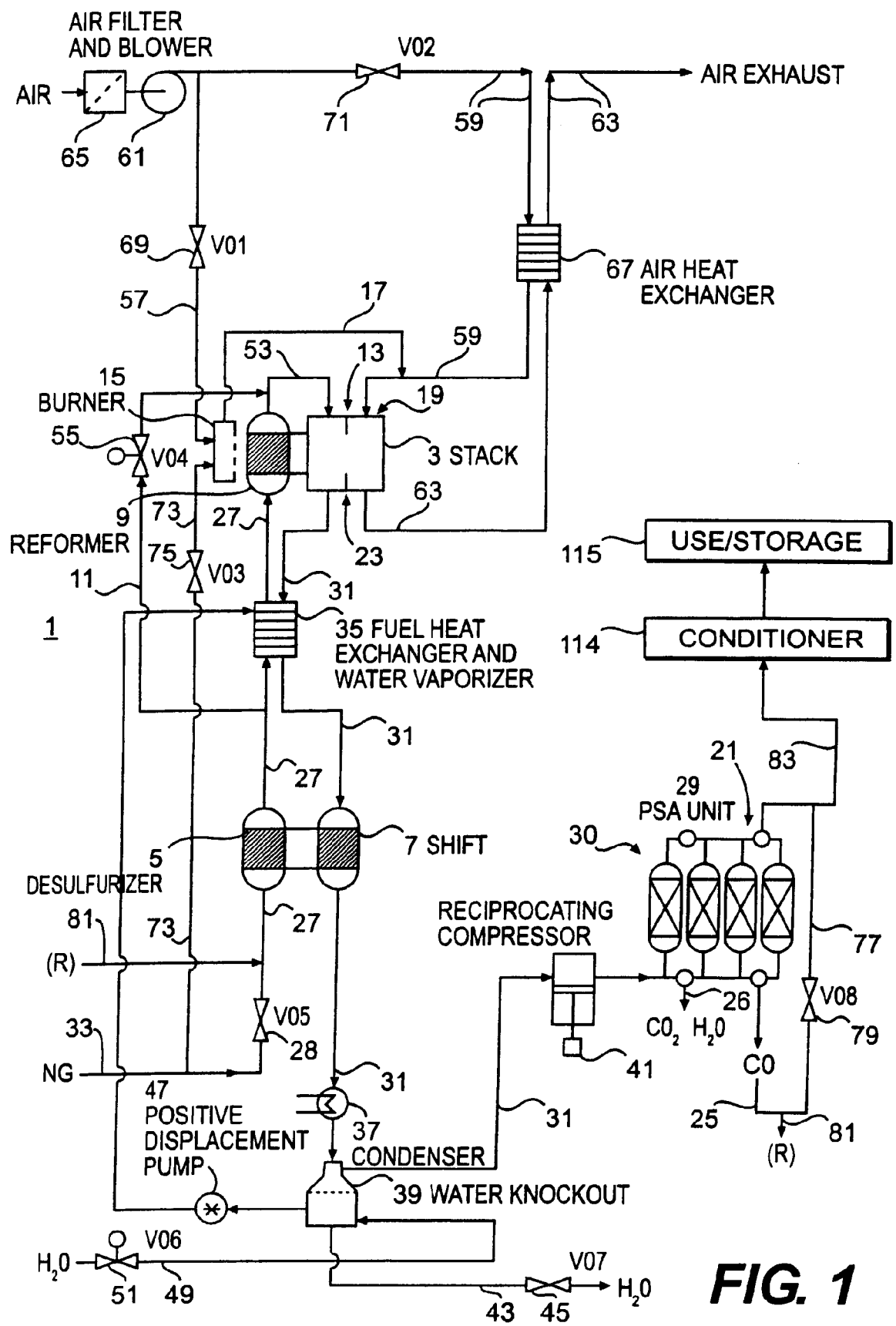
FIGS. 1, 2 and 7 are schematics of fuel cell systems according to preferred embodiments of the present invention.

FIG. 1 illustrates a fuel cell system 1 according to the preferred embodiments of the present invention. Preferably, the system 1 is a high temperature fuel cell stack system, such as a solid oxide fuel cell (SOFC) system or a molten carbonate fuel cell system. The system 1 may be a regenerative system, such as a solid oxide regenerative fuel cell (SORFC) system which operates in both fuel cell (i.e., discharge) and electrolysis (i.e., charge) modes or it may be a non-regenerative system which only operates in the fuel cell mode.

The system 1 contains a high temperature fuel cell stack 3. The stack may contain a plurality of SOFCs, SORFCs or molten carbonate fuel cells. Each fuel cell contains an electrolyte, an anode electrode on one side of the electrolyte in an anode chamber, a cathode electrode on the other side of the electrolyte in a cathode chamber, as well as other components, such as separator plates/electrical contacts, fuel cell housing and insulation. In a SOFC operating in the fuel cell mode, the oxidizer, such as air or oxygen gas, enters the cathode chamber, while the fuel, such as hydrogen or hydrocarbon fuel, enters the anode chamber. Any suitable fuel cell designs and component materials may be used.

The system 1 contains any one or more of the following elements, either alone or in any suitable combination. In a first embodiment, the system 1 contains a desulfurizer 5 and a water-gas shift reactor 7 that are thermally integrated with each other. The waste heat from the reactor 7 is used to heat the desulfurizer 5 to its operating temperature, thus reducing or eliminating the need for a separate desulfurizer heater.

In a second embodiment, the system 1 contains a hydrocarbon fuel reformer 9 and a hydrocarbon fuel by-pass line 11 fluidly connected to the fuel inlet 13 of the high temperature fuel cell stack 3. The by-pass line 11 by-passes the reformer 9 to provide unreformed hydrocarbon fuel into the fuel inlet 13 of the high temperature fuel cell stack 3 to control the temperature of the stack 3.

In a third embodiment, the hydrocarbon fuel reformer 9 is located separately from but thermally integrated with the high temperature fuel cell stack 3. A start-up burner 15 is thermally integrated with the reformer 9. Preferably but not necessarily, a start-up burner 15 effluent outlet conduit 17 is fluidly connected to an oxidizer inlet 19 of the high temperature fuel cell stack 3. This configuration allows the system 1 to be started up using only the hydrocarbon fuel and oxidizer without oxidizing SOFC anode electrodes. This configuration eliminates a separately stored reducing or inert purge gas that is flushed through the system to prevent the anode electrodes of the SOFCs from oxidizing.

In a fourth embodiment, a carbon monoxide separation device 21, such as pressure swing adsorption (PSA) device is fluidly connected to a fuel exhaust (i.e., the fuel outlet) 23 of the stack 3. A carbon monoxide recycle conduit 25 has an inlet that is connected to the outlet of the carbon monoxide separation device 21 and an outlet that is fluidly connected to a fuel inlet 13 of the high temperature fuel cell stack 3. For example, the device 21 allows carbon monoxide to be separately recirculated into a hydrocarbon fuel inlet conduit 27 of the stack 3 to enhance the electrochemical reaction in the fuel cells of the stack 3. Furthermore, since carbon monoxide is recirculated, less carbon monoxide is provided into the atmosphere than if the carbon monoxide from the system was simply flared or vented into the atmosphere.

In a fifth preferred embodiment, a PSA hydrogen separation device 29 is fluidly connected to the fuel exhaust 23 of the stack 3. A thermal output of the high temperature fuel stack 3 in addition to the fuel exhaust is thermally integrated with at least a first column of the PSA device 29 to heat the first column. This use of the stack 3 waste heat to heat a PSA column under purge allows a reduction in the compression requirements of the PSA device and/or an increase in the amount of gas purification for the same level of compression.

In a sixth preferred embodiment, a solid oxide fuel cell system with an improved balance of plant efficiency comprises a thermally integrated reformer, combustor and stack, where the reformer is heated by the stack cathode exhaust, by radiative and convective heat from the stack and by the combustor heat during steady state operation. In a seventh preferred embodiment, the system starts up with hydrogen generated using a CPDX (catalytic partial oxidation) reactor. In an eighth preferred embodiment, the system contains an energy efficient and self sufficient water management subsystem. The system contains at least one evaporator which uses stack anode exhaust to heat water being provided into the inlet fuel stream.

I. First Embodiment

The elements of the system 1 of the first embodiment will now be described. In prior art systems, organo-sulfur compounds (e.g., mercaptans, thiophenes) contained in natural gas fuel are hydrogenated by adding hydrogen to the fuel inlet stream and reacting the mixture in a desulfurizer over a suitable catalyst, such as cobalt-molybdenum. The reaction produces $CH_4$ and $H_2S$ gases. The $H_2S$ gas is subsequently removed by reaction with a fixed sorbent bed, containing for example ZnO or other suitable materials for removing this gas. Usually these reactions are carried out at about 300° C., and the catalyst and sorbent can be contained in the same vessel.

FIG. 1 illustrates an embodiment of a desulfurizer subsystem of the first embodiment, which comprises the desulfurizer 5 and the water-gas shift reactor 7 that are thermally integrated with each other.

The desulfurizer 5 preferably comprises the catalyst, such as Co—Mo or other suitable catalysts, which produces $CH_4$ and $H_2S$ gases from hydrogenated, sulfur containing natural gas fuel, and a sorbent bed, such as ZnO or other suitable materials, for removing the $H_2S$ gas from the fuel inlet stream. Thus, a sulfur free or reduced sulfur hydrocarbon fuel, such as methane or natural gas leaves the desulfurizer 5.

The water-gas shift reactor 7 may be any suitable device which converts at least a portion of the water exiting the fuel cell stack 3 fuel exhaust 23 into free hydrogen. For example, the reactor 7 may comprise a tube or conduit containing a catalyst which converts some or all of the carbon monoxide and water vapor in the tail gas exiting exhaust 23 through a fuel exhaust conduit 31 into carbon dioxide and hydrogen. The catalyst may be any suitable catalyst, such as an iron oxide or a chromium promoted iron oxide catalyst. The reactor 7 is preferably located along conduit 31 between the fuel exhaust 23 and the PSA hydrogen separation device 29. The reactor 7 works in tandem with the PSA hydrogen separation device 29 by increasing the amount of free hydrogen in the fuel side exhaust (i.e., anode exhaust or tail gas) by converting some water present in the fuel side exhaust gas into hydrogen. The reactor 7 then provides hydrogen and carbon dioxide to the PSA hydrogen separation device 29, which separates the hydrogen from the carbon dioxide. Thus, some of the water present in the fuel may be converted to hydrogen in the reactor 7.

The desulfurizer 5 and the water-gas shift reactor 7 are thermally integrated with each other. This means that waste heat from the reactor 7 is transferred directly or indirectly to the desulfurizer 5. For example, the desulfurizer 5 and the water-gas shift reactor 7 may be located in the same hot box such that they are thermally integrated with each other. Alternatively, the desulfurizer 5 and the water-gas shift reactor 7 may be located in thermal contact with each other (i.e., in direct physical contact or by contacting the same thermal mass). Alternatively, the desulfurizer 5 and the water-gas shift reactor 7 may be connected by a thermal conduit, such as a pipe containing a thermal transfer fluid, such as water/steam or another fluid.

The desulfurizer 5 is fluidly connected to the fuel inlet 13 of the fuel cell stack 3. The water-gas shift reactor 7 is fluidly connected to the fuel exhaust 23 of the fuel cell stack. The term fluidly connected means that the connection may be direct or indirect, as long as a gas or liquid fluid may be provided through the connection. Preferably, the desulfurizer 5 is connected to the fuel inlet 13 of the fuel cell stack 3 by the fuel inlet conduit 27. A valve 28 controls the flow of fuel through conduit 27. The water-gas shift reactor 7 is connected to the fuel exhaust 23 of the fuel cell stack 3 by the fuel exhaust conduit 31. It should be noted that the conduits 27 and 31 shown in FIG. 1 contain several portions or sections that are separated by various processing devices, such as the desulfurizer 5 and the water-gas shift reactor 7.

A method of operating the fuel cell system 1 according to the first embodiment includes providing a hydrocarbon fuel, such as natural gas, into a desulfurizer 5 from a hydrocarbon fuel source 33, such as a natural gas supply pipe or a hydrocarbon fuel storage tank or vessel. The fuel is desulfurized in the desulfurizer 5 and is then provided directly or indirectly into the fuel cell stack 3 through conduit 27 and inlet 13, as will be described in more details with respect to the other embodiments of the present invention.

The warm fuel exhaust is provided from the fuel cell stack 3 through exhaust 23 and conduit 31 into the water-gas shift reactor 7. Preferably, the exhaust has given up some of the heat in heat exchangers and other devices prior to entering the reactor. For example, an optional fuel heat exchanger and water vaporizer 35 may be provided between the conduits 27 and 31. The vaporizer 35 humidifies the fuel inlet stream in conduit 27. The vaporizer 35 can be a device which supplies water vapor based on cyclic desiccant beds or a rotating desiccant wheel (i.e., "enthalpy wheel") and which provides water vapor from an exhaust stream in conduit 31 into the fuel inlet stream in conduit 27 or the vaporizer 35 can be a steam generator which provides water vapor into the fuel inlet stream from another water source.

The warm exhaust gases react with each other according to the forward water gas shift reaction, $CO+H_2O \rightarrow CO_2+H_2$, in the reactor 7 and give up or provide heat to the desulfurizer 5 side and the incoming fuel gases passing through it. Preferably, the reactor 7 supplies all of the heat that is needed to operate the desulfurizer 5 at its standard operating temperature, such as at least about 300° C., and no other heating means or heaters are used to heat the desulfurizer 5.

The hydrogen, carbon monoxide, carbon dioxide and water vapor containing exhaust continues in conduit 31 to an optional condenser 37, optional water knockout or separation device 39 and a compressor 41, such as a reciprocating compressor, to the PSA hydrogen 29 and/or carbon monoxide 21 separation devices. The water knock out system 39 separates the water from the fuel exhaust stream and discharges it out of the water discharge conduit 43 controlled by valve 45, or recirculates it into the fuel heat exchanger and water vaporizer 35 using a positive displacement pump 47. The water is preferably provided into the stack 3 when the stack 3 is operated to generate hydrogen while generating little or no electricity in the fuel cell mode (i.e., no net electricity is produced in the fuel cell mode), as will be described in more detail below. The additional water is used to support fuel reforming as needed. An optional water inlet conduit 49 may also be connected to the water knockout device 39. Additional water may be provided for bootstrapping, as the electrochemical process will ordinarily generate net water. A flow control valve 51 position is controlled mechanically or by a computer dependent on the water level in the water knockout device. The valve 51 controls the amount of water provided into device 39 through conduit 49 based on the water level in the device 39.

II. Second Embodiment

FIG. 1 illustrates a system 1 of the second embodiment containing the hydrocarbon fuel by-pass line 11 which allows feeding the fuel cell stack 3 with an accurately controlled fuel input mixture for improved control of broad range of operating conditions, such as stack 3 operating temperature.

In the prior art, SOFCs are commonly operated with hydrocarbon fuels, such as methane. The methane may be partially or fully steam reformed to form hydrogen and carbon oxides before it enters the SOFC stack. Steam reformation is an endothermic process. If methane is only partially steam reformed, the remaining methane will be reformed within the SOFC. The endothermic reaction within the SOFC stack affects the thermal balance of the SOFC stack.

Oxidation of hydrocarbons in the high temperature fuel cells includes an endothermic reaction in which the hydrocarbon fuel, such as methane or natural gas, is converted to hydrogen and carbon oxides. This endothermic reaction may not be obvious in the net reaction occurring in the fuel cell system. One example is a solid oxide fuel cell fed with methane. In the net reaction, the methane is oxidized to carbon dioxide and water. However, it is electrochemically highly unlikely for the methane to be directly oxidized to the products. It is commonly assumed that some methane first reacts with steam, which is almost always present, to form hydrogen and carbon oxides. Then the hydrogen and lower carbon oxides are oxidized. The water formed by the oxidation of hydrogen can enable steam reformation of yet unconverted methane. The result of this intermediate chemical reaction is heat consumption at the location of the steam reformation.

Heat consumed by reformation inside the fuel cell thereby creates a cooling effect. This cooling effect can be localized and create temperature gradients and in turn thermal stresses which can damage part of the fuel cell. Thus, the reformation is partly or completely performed outside the fuel cell stack.

In the system 1 of the second embodiment, the hydrocarbon fuel reformer 9 is located separately from the high temperature fuel cell stack 3. The reformer is adapted to at least partially reform a hydrocarbon fuel into a hydrogen fuel. The hydrocarbon fuel is provided into the reformer 9 through the hydrocarbon fuel inlet conduit 27, connected to an inlet of the reformer 9. A connecting conduit 53 connects the fuel inlet 13 of the high temperature fuel cell stack 3 with an outlet of the reformer 9.

The hydrocarbon fuel reformer 9 may be any suitable device which is capable of partially or wholly reforming a hydrocarbon fuel to form a carbon containing and free hydrogen containing fuel. For example, the fuel reformer 9 may be any suitable device which can reform a hydrocarbon gas into a gas mixture of free hydrogen and a carbon containing gas. For example, the fuel reformer 9 may reform a humidified biogas, such as natural gas, to form free hydrogen, carbon monoxide, carbon dioxide, water vapor and optionally a residual amount of unreformed biogas. The free hydrogen and carbon monoxide are then provided into the fuel inlet 13 of the fuel cell stack 3 through conduit 53.

In a preferred aspect of the second embodiment, the fuel reformer 9 is thermally integrated with the fuel cell stack 3 to support the endothermic reaction in the reformer 9 and to cool the stack 3. The term "thermally integrated" in this context means that the heat from the reaction in the fuel cell stack 3 drives the net endothermic fuel reformation in the fuel reformer 9. The fuel reformer 9 may be thermally integrated with the fuel cell stack 3 by placing the reformer 9 and stack 3 in the same hot box and/or in thermal contact with each other, or by providing a thermal conduit or thermally conductive material which connects the stack 3 to the reformer 9. While less preferred, a separate heater may also be used to heat the reformer 9 instead of or in addition to the heat provided from the stack 3.

The hydrocarbon fuel by-pass line 11 is fluidly connected to the fuel inlet 13 of the high temperature fuel cell stack 3. In other words, the by-pass line may be connected directly to the inlet 13 or it may be indirectly connected to the inlet 13 via the connecting conduit 53. The terms "line" and "conduit" are used interchangeably, and include gas flow pipes and other fluid flow ducts. The by-pass line 11 is adapted to provide unreformed hydrocarbon fuel into the fuel inlet 13 of the high temperature fuel cell stack 3.

Preferably, the by-pass line 11 branches off from the hydrocarbon fuel inlet conduit 27 upstream of the reformer 9 and connects to the connecting conduit 53 downstream of the reformer 9. Preferably, the desulfurizer 5 is located upstream of a location where the by-pass line 11 branches off from the hydrocarbon fuel inlet conduit 27, such that sulfur is removed from the unreformed hydrocarbon fuel provided through the by-pass line 11.

Alternatively, the by-pass line 11 does not have to branch off from the fuel inlet conduit 27. In this case, the by-pass line 11 is connected to a separate source of hydrocarbon fuel, such as a natural gas pipe or a storage vessel. In this case, a separate desulfurizer is provided in the by-pass line 11.

The system 1 further comprises a hydrocarbon fuel flow control valve 55 in the by-pass line 11. The control valve 55 is adapted to control a flow of the unreformed hydrocarbon fuel into the fuel cell stack to control a temperature and/or other operating parameters of the fuel cell stack. The valve 55 may be manually or remotely controlled by an operator. Alternatively, the valve 55 may be automatically controlled by a computer or other processing device. The valve 55 may be controlled automatically or by an operator in response to detected or predetermined parameters. For example, the temperature or other parameters of the fuel cell stack 3 may be detected by a temperature detector or other detectors, and the results provided to an operator or a computer. The operator or computer then adjust the valve 55 to control the flow of the unreformed hydrocarbon fuel through the by-pass line 11 into the fuel cell stack 3 to control the fuel cell stack temperature or other parameters. Alternatively, the by-pass valve 55 may be adjusted based on predetermined parameters, such as based on time of stack 3 operation that is stored in the computer memory.

A method of operating a high temperature fuel cell system 1 of the second embodiment includes providing a hydrocarbon fuel into a reformer 9 through the fuel inlet conduit 27 and at least partially reforming the hydrocarbon fuel into hydrogen fuel in the reformer 9. The hydrogen fuel from the reformer 9 is provided into a fuel inlet of a high temperature fuel cell stack 3 through conduit 53. The unreformed hydrocarbon fuel that does not pass through the reformer 9 is provided into the fuel inlet of the high temperature fuel cell stack 3 through the by-pass line 11 and optionally through conduit 53. The flow of the unreformed hydrocarbon fuel through the by-pass line 11 that does not pass through the reformer 9 is controlled by the valve 55 to control a temperature and/or other operating parameters of the high temperature fuel cell stack 3.

The oxidation of hydrogen or low carbon oxides inside a fuel cell is an exothermic reaction. Heat generated by the exothermic oxidation should be removed to attain stable operation. Unreformed methane can aid in the removal of heat via the above described steam reformation in the reformer 9.

Accurately controlling the amount of unreformed hydrocarbons entering the stack allows control of the temperature of the fuel cells in the stack. In an external reformer, the degree of reformation depends on a variety of factors some of which may vary during operation. Thus, a simple way of controlling the amount of unreformed hydrocarbons entering the stack is the by-pass line 11 which by-passes the external reformer 9 as shown in FIG. 1. The bypass valve 55 controls the amount of unreformed hydrocarbons entering the stack 3. More specifically, the least amount of hydrocarbons entering the stack 3 is limited by the finite conversion inside the external reformer. An upper limit for the amount of unreformed hydrocarbons entering the stack 3 is posed by reformation occurring outside the external reformer along by-pass line 11.

This method of the second embodiment is applicable not only to solid oxide fuel cells, but any high temperature fuel cell fed by a fuel which undergoes reformation reactions prior to oxidation. In the example provided above, the reformation is an endothermic reaction, but there are also reformation reactions that are exothermic. Examples of exothermic reformation include but are not limited to partial oxidation of methane. Methane, which is the major constituent of natural gas, is a very common example of a hydrocarbon fuel that undergoes reformation, but other hydrocarbon fuels, such as natural gas, propane and butane are possible. Therefore the reformer by-pass 11 is applicable to various reformation reactions and a variety of hydrocarbon fuels.

Figure 2:
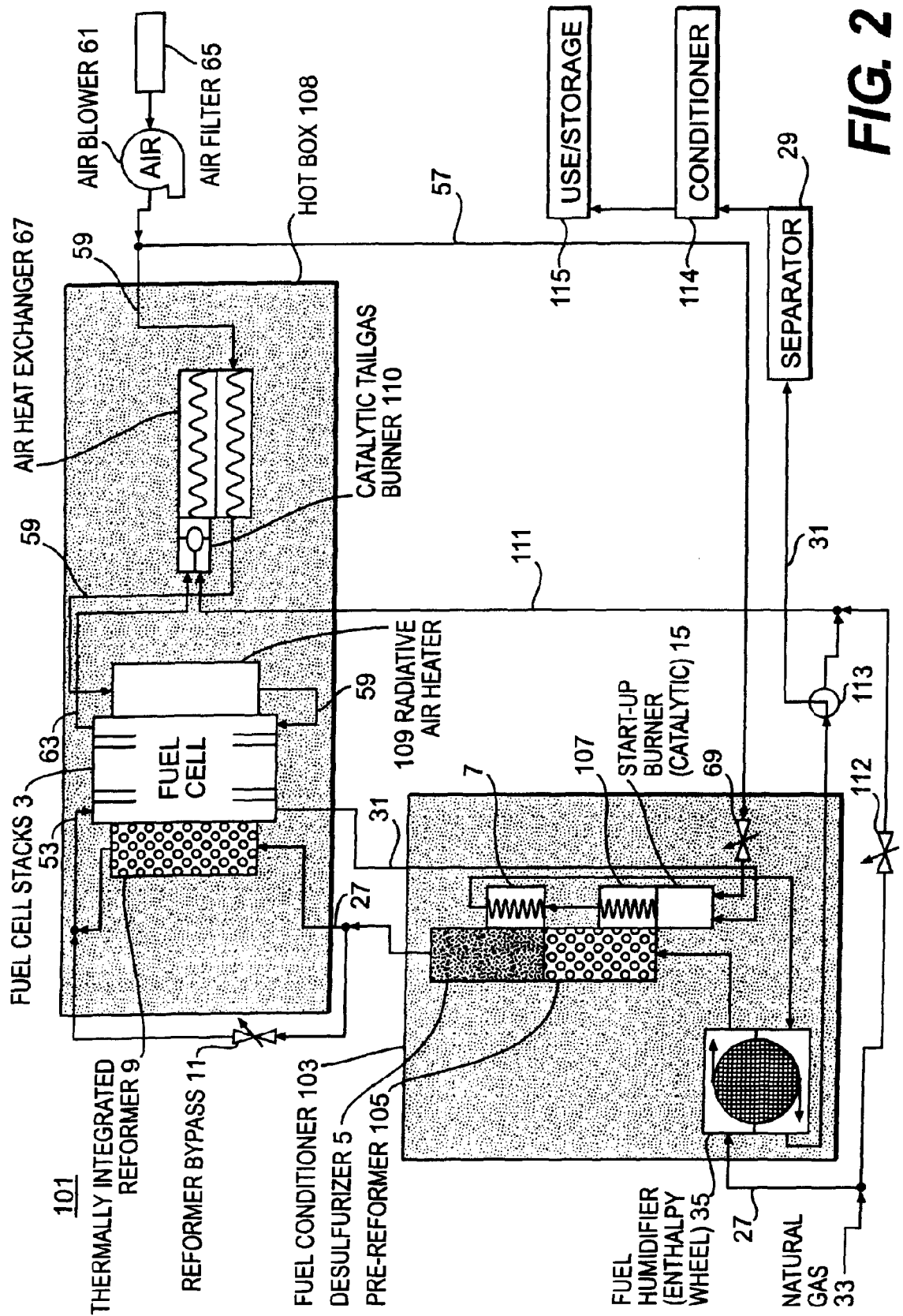

FIG. 2 illustrates a system 101 of the first and second embodiments having an alternative configuration from the system 1 shown in FIG. 1. In the system 101 shown in FIG. 2, the fuel heat exchanger and water vaporizer 35 is located upstream of the desulfurizer 5. Thus, the fuel enters the heat exchanger and water vaporizer 35 prior to entering the desulfurizer. The desulfurizer 5 and the water-gas shift reactor 7 are located in the same hot box 103 (i.e., a warm box or fuel conditioner). The fuel conditioner 103 also contains the catalytic start-up burner 15, the fuel heat exchanger and water vaporizer 35 and an optional fuel pre-reformer 105 which is thermally integrated with a fuel exhaust heat exchanger 107. Thus, the catalytic start-up burner 15 in the system 101 is located in the fuel conditioner 103 rather than thermally integrated with the fuel cell stack 3. The start-up burner 15 is fed by the stack fuel exhaust conduit 31 rather than by the hydrocarbon fuel inlet conduit 27.

The fuel cell stack 3 is thermally integrated with the reformer 9 in the same hot box 108. The hot box 108 also contains an optional radiative air heater 109 and an optional catalytic tail gas burner 110. The tail gas burner 110 is provided with hydrocarbon fuel from a branch 111 of the hydrocarbon fuel inlet conduit 27, which is regulated by valve 112. A valve 113 directs the fuel exhaust flow between the PSA hydrogen separation device 29 and the tail gas burner 110. The oxidizer side components are the same as in system 1 and will be described in more detail below.

III. Third Embodiment

FIG. 1 illustrates a system 1 of the third embodiment, where the system is brought up from room temperature to operating conditions (i.e., at start-up) with only hydrocarbon fuel and air. No stored nitrogen or hydrogen are required to protect the anodes from oxidation. The stack 3, reformer 9 and start-up burner 15 comprise separate devices which are thermally integrated with each other, such as being located in the same hot box and/or being in thermal contact with each other and/or being connected by a thermal fluid transfer conduit.

The anodes of SOFC systems are commonly made from materials including metal oxides which have to be reduced to attain electron conductivity and thereby enable the electrochemical reaction in the anode chamber. Metallic oxides used include, but are not limited to nickel oxide. One common difficulty with these metallic oxides is the necessity to keep them reduced once they have been reduced. Re-oxidation causes significant if not catastrophic performance degradation. The prevention of re-oxidation is a technical challenge for the start-up of a SOFC system.

Commonly, the fuel cell anode chamber is flushed with inert or reducing gases, such as nitrogen or hydrogen, at start-up to prevent anode electrode re-oxidation. For systems operated on hydrocarbon fuels, nitrogen or hydrogen are not readily available. Instead one or both gases are stored separately within or near the system for consumption during start-up.

The inventor has realized that a SOFC system can be built and operated such that the anode can be maintained in its reduced state while the system is operating only on hydrocarbon fuel and air during start-up. FIG. 1 illustrates one configuration of a SOFC system 1 according to the third embodiment.

As shown in FIG. 1, the start-up burner 15 is thermally integrated with the reformer 9 and the reformer 9 is thermally integrated with the stack 3. As discussed above, the term "thermally integrated" includes location in the same hot box, located in thermal contact with each other and/or connection by a thermal transfer fluid conduit. The hydrocarbon fuel inlet conduit 27 is fluidly connected to an inlet of the reformer 9 and to a first inlet of the start-up burner 15 (such as via the burner fuel delivery conduit 73). A burner oxidizer inlet conduit 57 is connected to a second inlet of the start-up burner 15. The start-up burner 15 effluent outlet conduit 17 is fluidly connected to an oxidizer inlet 19 of the high temperature fuel cell stack 3. For example, the effluent outlet conduit 17 may be connected directly into the oxidizer inlet 19 of the stack or it may be connected to an oxidizer inlet conduit 59 which is connected to the oxidizer inlet 19 of the stack 3. The system also contains an oxidizer blower 61, such as an air blower, which provides the oxidizer into the burner and stack through the conduits 57 and 59, and an oxidizer exhaust conduit 63 which removes oxidizer exhaust from the stack 3. The system also contains an optional air filter 65 and an optional heat exchanger 67 which heats the oxidizer being provided into the stack 3 through the oxidizer inlet conduit 59 using the heat of the oxidizer exhaust being provided through the oxidizer exhaust conduit 63. The system also contains valves 69 and 71 in conduits 57 and 59, respectively. The system also contains a burner fuel delivery conduit 73 which is regulated by valve 75. The conduit 73 branches off from conduit 27 or it may comprise a separate fuel delivery conduit.

The method of operating the system 1 according to the third embodiment is as follows. Initially all components of the system are at room temperature. The anodes of the SOFC stack are reduced from previous operation. Valves 69 and 75 in conduits 57 and 73, respectively, are open, while valve 71 in conduit 59 is closed.

Hydrocarbon fuel, which can be natural gas, and an oxidizer, such as air or oxygen, are injected into the start-up burner 15 through conduits 73 and 57, respectfully. The fuel and oxidizer are ignited in the burner 15 by an ignitor. The heat stream from the combustion in the burner 15 is directed at the thermally integrated reformer 9. The effluent of the burner 15 is directed through conduits 17 and 59 into the oxidizer inlet 19 (i.e., cathode chamber(s)) of the stack 3. The effluent is exhausted from the stack 3 through conduit 63 and from there into the air heat exchanger 67. It may be advantageous to operate the burner lean on fuel to ensure that the cathode chamber(s) of the fuel cells in the stack are always exposed to an oxidizing environment. The combustion raises primarily the temperature of the reformer 9, secondarily the stack 3 temperature, and finally the air heat exchanger 67 temperature.

Fuel is directed through the desulfurizer 5, vaporizer 35 and the reformer 9, into the stack 3 fuel inlet 13 (i.e., into the anode chamber(s) of the fuel cells in the stack). The fuel may be directed into inlet 13 simultaneously with injecting fuel and oxidizer into the burner 15. Alternatively, the fuel may be directed into the inlet 13 after it is directed into the burner 15 but before the stack 3 reaches the anode oxidation temperature. The fuel exhaust exits the stack 3 through conduit 31 and water-gas shift reactor 7. The fuel picks up heat in the reformer 9 and in the stack 3 and transports the heat to the water gas shift reactor 7 which is thermally coupled to the desulfurizer 5. Thereby the desulfurizer 5 is heated to operating conditions by the stack 3 exhaust, as provided in the first embodiment. Some heat is also delivered to the water vaporizer 7.

The heat balance in the system is designed such that the reformer 9 reaches its operating temperature (i.e., the temperature at which it reforms the hydrocarbon fuel) before the stack 3 anode chamber(s) reaches a temperature were re-oxidation of the anode electrodes could occur. Also, enough heat is carried to the water vaporizer 35 such that the inflowing fuel is sufficiently humidified to avoid carbon formation in the hot components downstream of the water vaporizer 35.

If these method parameters are satisfied, the SOFC anode electrodes will be exposed to a hydrogen rich feed stream created by steam reformation in the reformer 9 when a temperature at the anode is reached at which re-oxidation can occur. At the same time, the desulfurizer 5 is brought to operating temperature early enough to avoid detrimental effects of excessive sulfur content in the fuel feed stream. One preferred hydrocarbon fuel for this system is natural gas. However other fuels, including but not limited to methane, propane, butane, or even vaporized liquid hydrocarbons can be utilized.

After the start-up of the system 1 is completed (i.e., once the stack reaches desired steady state operating conditions), hydrocarbon fuel and oxidizer supply into the start-up burner is terminated either by an operator or automatically by a computer and the start-up burner is turned off. Valves 69 and 75 are closed and valve 71 is opened to provide an oxidizer into the oxidizer inlet 19 of the solid oxide fuel cell stack 3. The stack 3 then operates in the fuel cell mode to generate electricity from an electrochemical reaction of the fuel provided through conduit 27 and reformer 9 (and optionally through by-pass line 11) and oxidizer provided through conduit 59. Thus, it should be noted that the oxidizer is preferably not provided into oxidizer inlet 19 of the solid oxide fuel cell stack 3 while the start-up burner 15 operates. Furthermore, no separately stored reducing or inert gases are used to flush the anode chambers of the solid oxide fuel cells of the stack 3 during the start-up.

IV. Fourth Embodiment

FIG. 1 illustrates a system 1 of the fourth embodiment, where the carbon monoxide and hydrogen are separately extracted from the fuel exhaust stream and recirculated into the fuel inlet stream and/or removed from the system for other use.

The system 1 contains a hydrogen separation or purification device 29 fluidly connected to a fuel exhaust 23 of the stack 3. Preferably, the device 29 comprises a PSA device that is connected to the exhaust 23 of the stack 3 by the fuel exhaust conduit 31. The PSA device 29 is adapted to separate at least a portion of hydrogen from the fuel exhaust while the fuel cell stack 3 generates electricity in a fuel cell mode. A reciprocating pump 41 provides the fuel exhaust into the PSA device 29. The hydrogen separation or purification device 29 preferably contains the carbon monoxide separation device or unit 21 and a carbon dioxide/water separation device or unit 30. Preferably, the devices 21 and 30 comprise PSA devices which respectively separate carbon monoxide and carbon dioxide/water from the fuel exhaust and allow hydrogen to pass through. Preferably, but not necessarily, the PSA device 21 is located in series with and downstream from PSA device 30. However, if desired, the PSA device 21 may be located upstream of PSA device 30. Preferably, PSA devices 21 and 30 comprise different units of a single PSA system 29, where each unit 21 and 30 contains at least two PSA columns.

A carbon monoxide recycle conduit 25 recirculates the carbon monoxide from the PSA device 21 into the fuel inlet conduit 27. A carbon dioxide/water removal conduit 26 removes carbon dioxide and water from device 30. The inlet of conduit 25 is connected to the outlet of the carbon monoxide separation device 21 and the outlet of conduit 25 is fluidly connected to the fuel inlet of the high temperature fuel cell stack 3, such as via the fuel inlet conduit 27. Alternatively, the outlet of the carbon monoxide recycle conduit 25 may be connected directly into the reformer 9 and/or into the fuel inlet 13 of the stack 3.

The system further comprises an optional hydrogen recycle conduit 77 which is controlled by a recirculated hydrogen flow control valve 79. The inlet of the conduit 77 is connected to the outlet of the hydrogen separation device 29. The outlet of the conduit 77 is fluidly connected to the fuel inlet 13 of the high temperature fuel cell stack 3, such as directly connected to the inlet 13 or indirectly connected via the fuel inlet conduit 27. If desired, the conduit 77 may be omitted and hydrogen and carbon monoxide may be carried together through conduit 25, which may result in a higher purity product or lower compression requirements. If desired, the flow of hydrogen passed through conduit 25 may be metered.

Preferably, the outlet of conduits 25 and 77 are merged together into a recycle conduit 81, which provides the recirculated hydrogen and carbon monoxide into the fuel inlet conduit 27, as shown in FIG. 1, or directly into the reformer 9 and/or the stack 3 fuel inlet 13. However, the recycle conduit 81 may be omitted, and the conduits 25 and 77 may separately provide carbon monoxide and hydrogen, respectively, into conduit 27, reformer 9 and/or stack 3 fuel inlet 13. The system 1 also optionally contains a hydrogen removal conduit 83, which removes hydrogen from the system 1 for storage or for use in a hydrogen using device, as will be described in more detail below.

Figure 3:
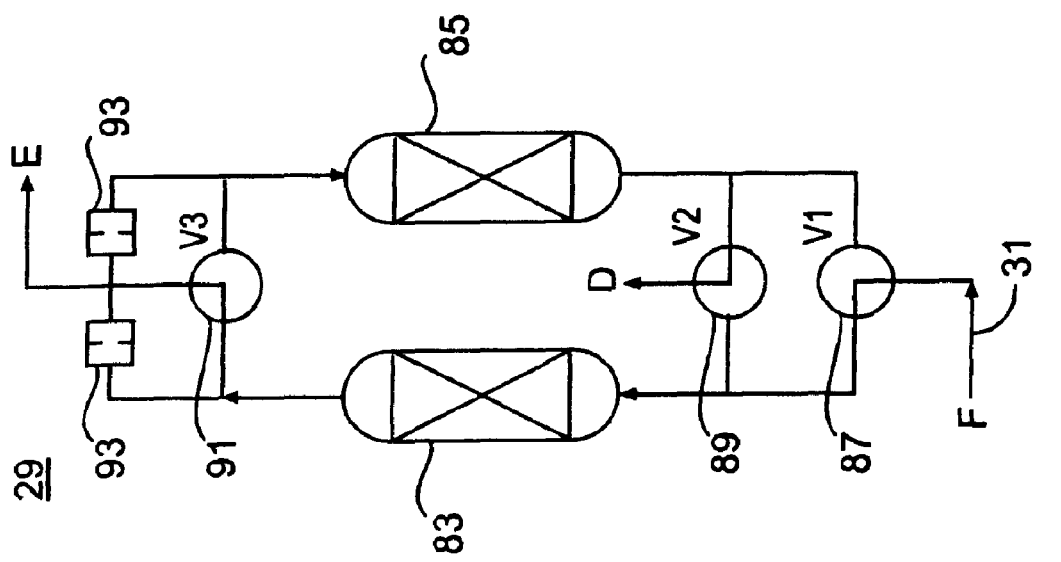

FIG. 3 illustrates an exemplary two column PSA hydrogen separation device 29, such as, for example, the carbon dioxide/water separation unit 30 of a larger device or system 29 which also contains the carbon monoxide separation unit 21 shown in FIG. 1. Preferably, the PSA device 29 operates on a Skarstrom-like PSA cycle. The classic Skarstrom cycle consists of four basic steps: pressurization, feed, blowdown, and purge. The device 29 contains two columns 83 and 85. When one column is undergoing pressurization and feed, the other column is undergoing blowdown and purge. In one exemplary configuration, the device 29 may be operated using three three-way valves 87, 89 and 91 and one or more flow restrictors 93. Of course other configurations may also be used. When the three-way valves are in the positions shown in FIG. 3, the pressurization and feed steps are essentially combined, and the blowdown and purge steps are similarly combined.

The PSA device 29 operates as follows. A pressurized feed gas (F), such as the fuel exhaust gas, containing $CO_2$, $H_2O$, CO and $H_2$ is provided through the fuel exhaust conduit 31. Two-position, three-way valves 87, 89 and 91 are simultaneously switched to the state shown in FIG. 3A. The feed is introduced to column 83 via valve 87 pressurizing column 83. The adsorbent contained in column 83 selectively adsorbs the $CO_2$ and $H_2O$. As the feed continues to flow, most of the $H_2$ exits as extract (E) via valve 91. The extract may be provided into conduits 77 and/or 83 shown in FIG. 1, or into the carbon monoxide PSA device 21 to remove carbon monoxide from the extract. The device 21 operates in the same way as the portion of the device 29 shown in FIG. 3, except the bed materials in the columns are selected to separate hydrogen from carbon monoxide.

The switching of valve 89 exposes column 85 to a low pressure line, resulting in the blowdown of column 85. The low pressure line 95 is the output of column 83 that passes through one or more flow restrictors 93. Gases that were previously adsorbed during the previous cycle desorb and flow out through valve 89, producing a desorbate stream (D). The desorbate stream may be provided into the carbon monoxide PSA device 21 to remove carbon monoxide from the desorbate stream. Meanwhile, a relatively small quantity of high pressure extract gas flows through the flow restrictor(s) 93 and through column 85 in the direction opposite to the feed flow, forming a purge flow that helps remove desorbate from column 85.

At a subsequent time, as column 83 approaches saturation, the positions of all valves are switched. Thus, column 85 becomes the column fed via valve 87 and is pressurized, and column 83 vents via valve 89 and blows down. In this way the purity of the extract gas E is maintained.

A method of operating the system 1 of the fourth embodiment will now be described. A fuel and an oxidizer are provided into the fuel cell stack 3 through conduits 27/53 and 59, respectively. A fuel side exhaust stream is generated from the fuel cell stack 3 through conduit 31 while the fuel and the oxidizer are provided into the fuel cell stack 3 operating in a fuel cell mode (i.e., while the stack is generating electricity). At least a portion of the hydrogen is separated from the fuel side exhaust stream by the PSA hydrogen separation device 29 during the fuel cell mode operation. For example, the hydrogen and carbon monoxide are separated from carbon dioxide and water in the PSA carbon dioxide/water separation device or unit 30. Then, at least a portion of carbon monoxide is separated from the fuel side exhaust stream (i.e., from the hydrogen) in the PSA carbon monoxide separation device or unit 21. At least a portion of the separated carbon monoxide is recirculated from PSA device 21 through conduits 25 and 81 into the fuel inlet gas stream in the fuel inlet conduit 27 and/or in conduit 53. The separated hydrogen from the PSA device 29 may also be recirculated into the fuel inlet gas stream through conduits 77 and 81, or provided to a hydrogen storage vessel or to a hydrogen using device 115 outside the system 1 through conduit 83, or both. The valve 79 may be used to determine the portion of the separated hydrogen being provided through conduits 77 and 83.

V. Fifth Embodiment

Figure 4:
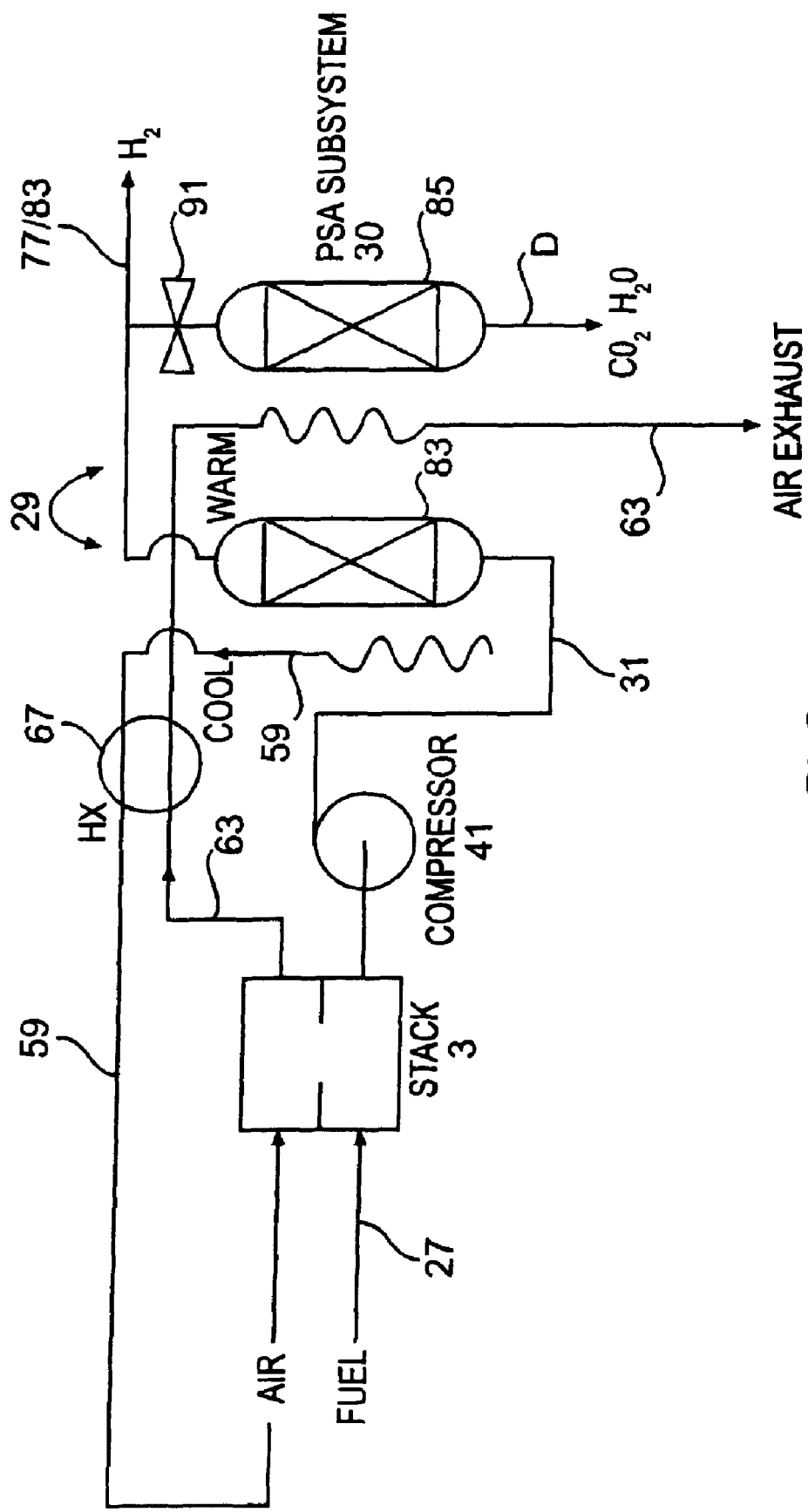
FIG. 4 is a schematic of a fuel cell system according to the fifth preferred embodiment of the present invention.

FIGS. 1 and 4 illustrate a system 1 of the fifth embodiment, which utilizes hydrogen separation from the fuel exhaust stream using temperature-assisted pressure swing adsorption. In this system, the fuel cell stack 3 thermal output and the PSA hydrogen separation device 29 are thermally integrated. In FIG. 4, the carbon dioxide/water separation unit 30 of the device 29 is illustrated for clarity.

A high temperature fuel cell system 1, such as a SOFC system, produces hydrogen by way of hydrocarbon reforming reactions that occur within the stack 3 and/or within the reformer 9. The hydrogen appears in the system's tailgas (i.e., the stack exhaust), and can be effectively separated and purified in a pressure-swing adsorption (PSA) device 29. The gas compression costs associated with the PSA process can be considerable. The process of the fifth embodiment takes advantage of heat available from the other parts of the system 1 to reduce those compression costs.

The PSA device 29 operates with a pressure differential between its pressurization/loading and blow-down/purge steps. The pressure differential, and the associated change in loading of the adsorbed gases, produces the gas separation. Generally, the higher the pressure differential, the more effective the separation and the less amount of purge gas required. As shown in the example of FIG. 3, the product gas is typically used as the purge gas, and so its use often needs to be minimized. Typically, the pressure ratio of the pressurization to purge steps is approximately 10:1, and approximately 10 to 20% of the product gas is lost as purge.

The SOFC stack 3 often operates at pressures near ambient, and thus the fuel exhaust or tailgas containing hydrogen is also near ambient. In a typical non-thermally integrated design, in order to reach pressures effective for PSA, the tailgas should be compressed by about a factor of 10. This pressurization is usually not an issue for hydrogen production plants that use steam methane reforming, because they often operate at about 10 atmospheres pressure or above.

If heat is provided during purging steps and removed during loading steps, the separation process can be made more effective. This would allow a lower level of compression to be used to achieve a similar separation objective. Alternatively, a higher degree of purification may be achieved for the same level of compression. This can occur because the loading of a adsorbed gas is a strong function of temperature as well as pressure.

In many separation systems it is not cost-effective to produce and remove this heat. In a high temperature fuel cell system, such as a SOFC system, however, heat of an adequate quality is readily available.

In one example shown in FIG. 4, warm exhaust air from the stack 3 flowing through oxidizer exhaust conduit 63 is used to heat a PSA column under purge 85, and cool inlet air flowing through the oxidizer inlet conduit 59 is used to cool a column 83 under load.

In another example, a coolant fluid may circulate between the stack 3 operating at an elevated temperature and the PSA separation system 29 through a circulation conduit. The fluid removes excess heat from the stack 3 and carries it to the separation system 29, where it is used to heat the gas used to purge the columns. There are a wide variety of ways to achieve these effects using the various heat sources available in a high temperature fuel cell system, such as a SOFC system.

Thus, in the system of the fifth embodiment, the compression requirements for a pressure-swing adsorption separation system for hydrogen are reduced by using waste heat from a SOFC stack to effect a more efficient separation. Alternatively, a higher degree of purification may be achieved for the same level of compression. In other words, the extract purity is improved if the column being purged could be heated with heat originating from a high temperature fuel cell stack, and the column being fed could be cooled. Alternatively, the pressure of the feed gas might be reduced, or the amount of purge gas might be reduced, while the extract purity was maintained. The benefits of this method are reduced capital equipment costs associated with compression and/or higher product value associated with higher purity.

While the method of fifth embodiment was described with respect to the carbon dioxide/water separation unit 30 of the PSA hydrogen separation device 29, it may also be used with the PSA carbon dioxide separation device or unit 21 in addition to or instead of the carbon dioxide/water separation unit 30. In this case, the waste heat from the high temperature fuel cell system is used to heat the column under purge in the carbon monoxide separation device 21 in addition to or instead of the column under purge in the carbon dioxide/water separation unit 30. This may be accomplished by providing heat from the oxidizer exhaust conduit 63 to the column under purge in device 21 and/or by providing heat from the coolant fluid in the circulation conduit. If desired, the column under load in the device 21 may be cooled by the cool inlet air flowing through the oxidizer inlet conduit 59.

Figure 5:
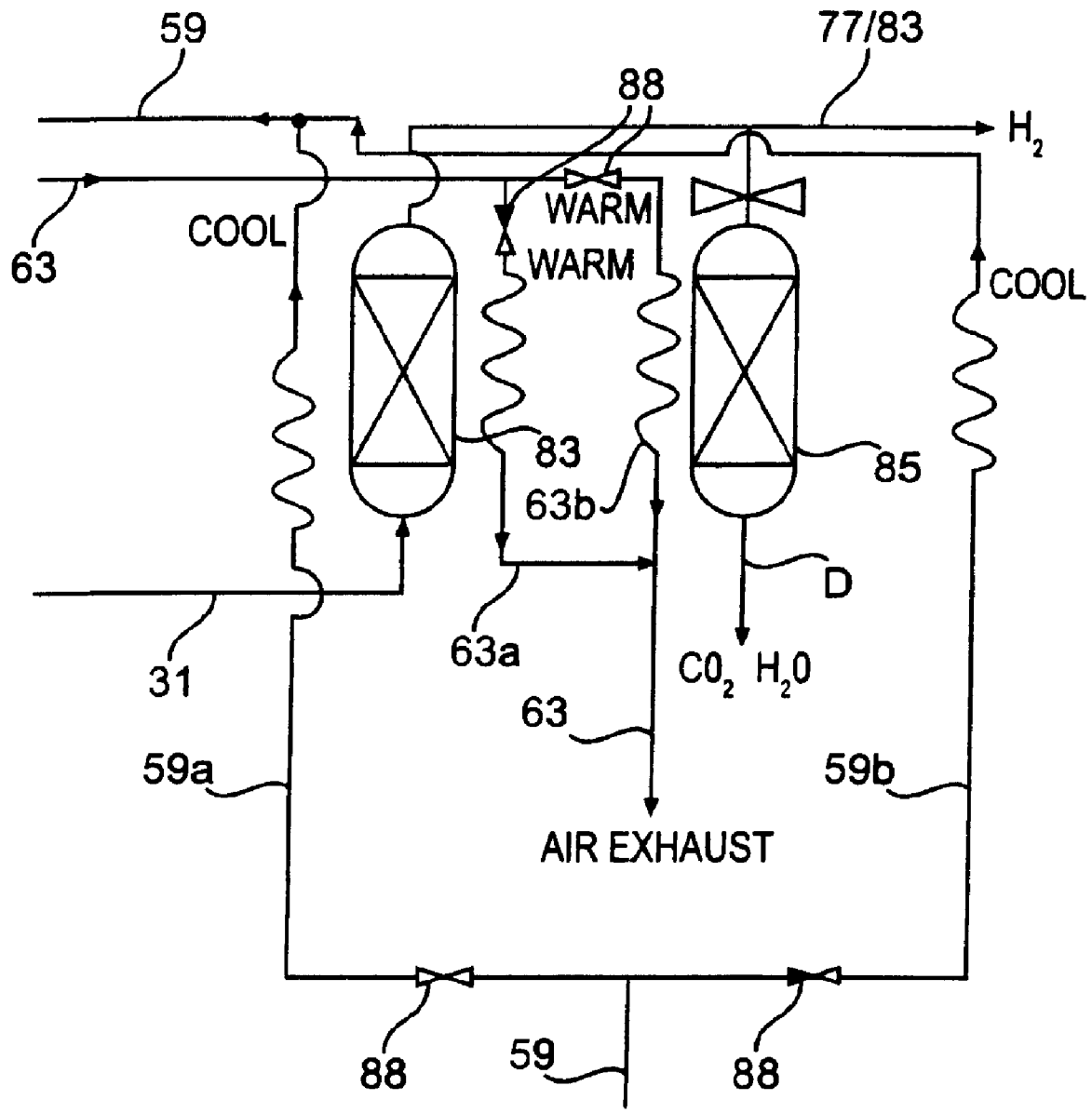
FIG. 5 shows the details of the system of FIG. 4.

Since each column of the PSA devices 21 and 29 is alternated between being the column under load and column under purge, the oxidizer inlet conduit 59 and the oxidizer exhaust conduit 63 are thermally integrated with all columns of each applicable PSA device 21 and/or 29, as shown in FIG. 5. For example, each conduit 59, 63 may be split into as many parallel branches as there are columns in the respective PSA device. Each branch 59A, 59B, 63A, 63B of the respective conduit 59, 63 is thermally integrated with a respective column 83, 85, of the PSA 29 device. The flow of cool or hot air through each branch is controlled by a valve 88. In other words, each PSA device column 83 and 85 is thermally integrated with a branch 59A, 63A and 59B, 63B of both conduits 59 and 63. However, only cool or warm air is provided to a particular column depending on if the column is undergoing loading or purging.

Likewise, if the coolant fluid is circulated between the stack 3 operating at an elevated temperature and the PSA separation system 29 through a circulation conduit, then the circulation conduit is split into parallel branches, and each branch is thermally integrated with a respective PSA column. The flow of the coolant fluid is controlled to each branch by a valve, such that the warm coolant fluid flows only to those columns that are undergoing purging.

It should be noted that the term "thermally integrated" in the context of the fifth embodiment means that the conduit either thermally contacts the respective PSA column or that it is located adjacent to and preferably in the same thermal enclosure, such as a hot box or thermal insulation, as the respective PSA column, to be able to transfer heat to the column.

Figure 6:
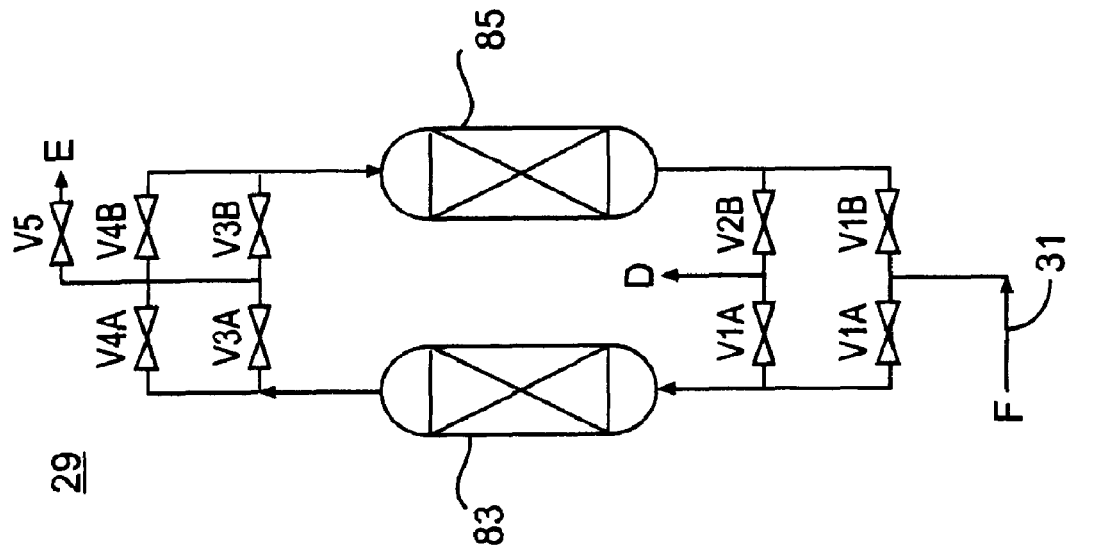
FIGS. 3 and 6 are schematics of PSA gas separation devices according to the preferred embodiments of the present invention.

FIG. 6 illustrates an alternative example of a PSA unit 21 or 30 of the PSA device 29, where all gas flows are decoupled. In the PSA system shown in FIG. 6, if valves V1, V2 and V3 (numbered 87, 89 and 91 in FIG. 3) are replaced by pairs of two-way valves V1A-V3B (i.e., a two-way valve would be placed on each horizontal branch stemming from valves V1-V3, and locations V1, V2 and V3 corresponding to the valves 87, 89 and 91 become "T" shaped conduit junctions), flow restrictors 93 are replaced by actuating valves V4A and V4B, and the extract line is valved (V5), then all flows can be decoupled. In particular, the blowdown/purge steps can be decoupled and the pressurization/feed steps can be decoupled. This may have advantages in terms of improvement of purity and reduction of purge losses, although at the cost of additional equipment. Furthermore, the lengths of the feed and purge steps can be decoupled. Either can be of arbitrary length. Clearly this can interrupt the flow of purified extract, and so occasionally additional beds are provided that increase the system's flexibility and do not interrupt the flow.

VI. Sixth Embodiment

The elements of a system 201 of the sixth embodiment will now be described with respect to FIG. 7. Elements in FIG. 7 with the same numbers as in FIGS. 1 and 2 should be presumed to be the same unless noted otherwise. If desired, the system 201 may be used with any one or more suitable elements of the first, second, third, fourth and/or fifth embodiments, even if these elements are not explicitly shown in FIG. 7.

In the sixth embodiment, steam methane reformation (SMR) is used to preprocess natural gas before it is fed into the stack 3 for co-generation of hydrogen and electricity from natural gas or other hydrocarbon fuel using a solid oxide fuel cell system (i.e., a regenerative or a non-regenerative system). SMR transforms methane to reaction products comprising primarily carbon monoxide and hydrogen, as described above. These reaction products are then oxidized in the SOFC stack 3 at high temperature producing electricity. Excess hydrogen is retrieved as a side product. Steam methane reformation reactions are endothermic reactions which require heat, while oxidation reactions in SOFC stack 3 are exothermic reactions which generate heat. This provides a synergy for tight heat integration to improve overall Balance of Plant (BOP) energy efficiency. By integration of reformer 9 and stack 3 in the hot box 108, heat from the stack 3 can be transferred to the reformer 9 using convective, radiative and/or conductive heat transfer.

In system 1 illustrated in FIG. 1, the reformer 9 is thermally integrated with the stack 3 for heat transfer from the stack 3 to the reformer 9. The stack 3 generates enough heat to conduct the SMR reaction in the reformer 9 during steady-state operation of the system 1. However, under some different operating conditions ranging from low to high stack efficiency and fuel utilization, the exothermic heat generated by the stack 3 and provided to the reformer 9 may be in greater than, the same as or less than the heat required to support the steam methane reforming reaction in the reformer 9. The heat generated and/or provided by the stack 3 may be less than required to support steam reformation in the reformer 9 due to low fuel utilization, high stack efficiency, heat loss and/or stack failure/turndown. In this case, supplemental heat is supplied to the reformer 9.

In a preferred aspect of the sixth embodiment, the system 201 provides the supplemental heat to the reformer 9 to carry out the SMR reaction during steady state operation. The supplemental heat may be provided from a burner 15 (more generally referred to in this embodiment as a combustor) which is thermally integrated with the reformer 9 and/or from a cathode (i.e., air) exhaust conduit which is thermally integrated with the reformer 9. While less preferred, the supplemental heat may also be provided from the anode (i.e., fuel) exhaust conduit which is thermally integrated with the reformer. Preferably, the supplemental heat is provided from both the combustor 15 which is operating during steady state operation of the reformer (and not just during start-up) and from the cathode (i.e., air) exhaust of the stack 3. Most preferably, the combustor 15 is in direct contact with the reformer 9, and the stack cathode exhaust conduit 203 is configured such that the cathode exhaust contacts the reformer 9 and/or wraps around the reformer 9 to facilitate additional heat transfer. This lowers the combustion heat requirement for SMR.

Preferably, the reformer 9 is sandwiched between the combustor 15 and one or more stacks 3 to assist heat transfer, as illustrated in FIGS. 8-10 and as described in more detail below. The combustor 15, when attached to the reformer 9, closes the heat balance and provides additional heat required by the reformer. When no heat is required by the reformer, the combustor unit acts as a heat exchanger. Thus, the same combustor (i.e., burner) 15 may be used in both start-up and steady-state operation of the system 201. When using combustion catalysts coated on the conduit walls, natural gas is preferably introduced at several places in the combustion zone to avoid auto ignition and local heating.

Preferably, one or more sensors are located in the system 201 which are used to determine if the reformer requires additional heat and/or how much additional heat is required. These sensors may be reformer temperature sensor(s) which measure the reformer temperature and/or process parameter sensor(s), which measure one or more of fuel utilization, stack efficiency, heat loss and stack failure/turndown. The output of the sensor(s) is provided to a computer or other processor and/or is displayed to an operator to determine if and/or how much additional heat is required by the reformer. The processor or operator then controls the combustor heat output based on the step of determining to provide an desired amount heat from the combustor to the reformer. The combustor heat output may be controlled by controlling the amount of fuel and air being provided into the combustor or by shutting off the fuel and/or air being provided into the combustor. The combustor may be controlled automatically by the processor or manually by operator actions.

Preferably, the combustor 15 exhaust is provided into the inlet of the air heat exchanger 67 through conduit 205 to heat the air being provided into the stack 3 through the exchanger 67. Thus, the stack cathode exhaust is provided to the exchanger 67 indirectly through the combustor 15. The configuration of system 201 differs from that of system 1 illustrated in FIG. 1 where the stack cathode exhaust is provided directly into the exchanger 67 through conduit 63.

The reformer 9 is located in close proximity to the stack 3 to provide radiative and convective heat transfer from the stack 3 to the reformer. Preferably, the cathode exhaust conduit 203 of the stack 3 is in direct contact with the reformer 9 and one or more walls of the reformer 9 may comprise a wall of the stack cathode exhaust conduit 203. Thus, the cathode exhaust provides convective heat transfer from the stack 3 to the reformer 9.

Furthermore, if desired, the cathode exhaust from the stack may be wrapped around the reformer 9 by proper ducting and fed to the combustion zone of the combustor 15 adjacent to the reformer 9 before exchanging heat with the incoming air in the external air heat exchanger 67, as shown in FIGS. 8-10 and as described in more detail below. Natural gas or other hydrocarbon fuel can be injected and mixed with cathode exhaust air in the combustion zone of the combustor 15 to produce heat as needed.

FIGS. 8-10 illustrate three exemplary configurations of the stack, reformer and combustor unit in the hot box 108. However, other suitable configurations are possible. The reformer 9 and combustor 15 preferably comprise vessels, such as fluid conduits, that contain suitable catalysts for SMR reaction and combustion, respectively. The reformer 9 and combustor 15 may have gas conduits packed with catalysts and/or the catalysts may be coated on the walls of the reformer 9 and/or the combustor 15.

Figure 8A:
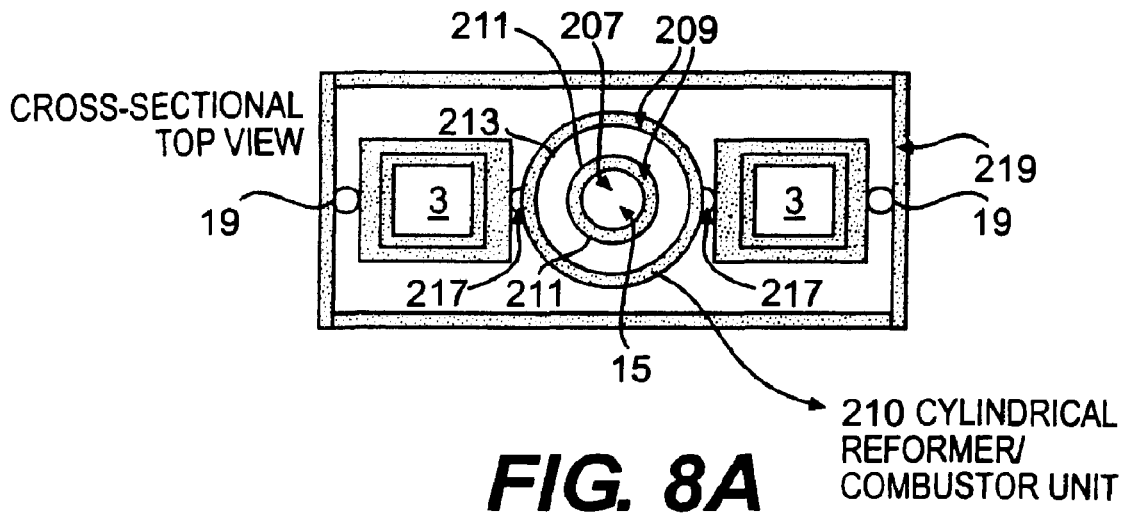
FIGS. 8A and 8B are schematics of integrated cylindrical reformer, combustor and stack unit for a system with two stacks.
Figure 9A:
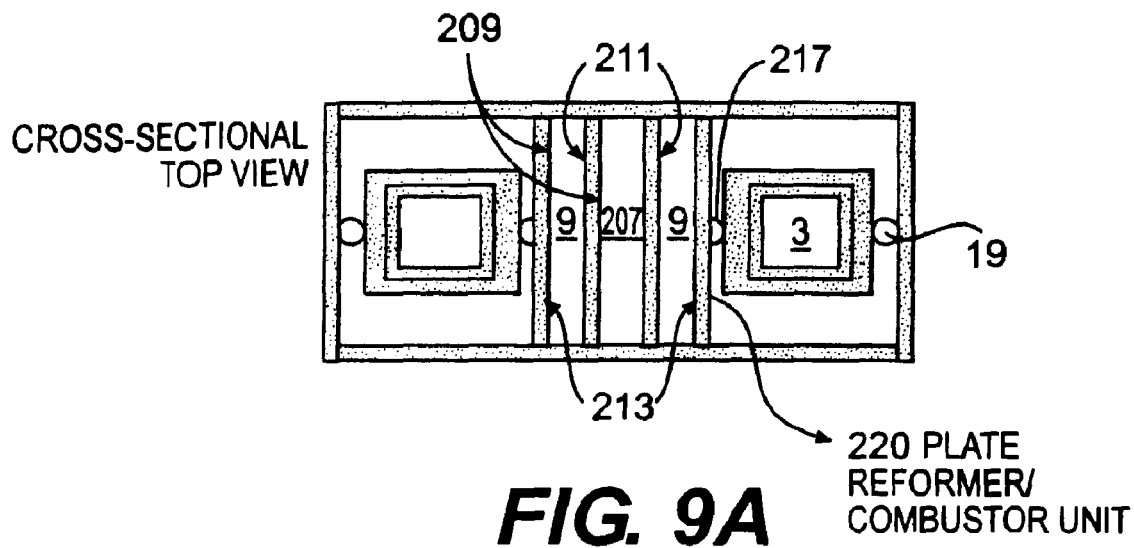
FIGS. 9A and 9B are schematics of integrated plate type reformer, combustor and stack unit for a system with two stacks.
Figure 10A:
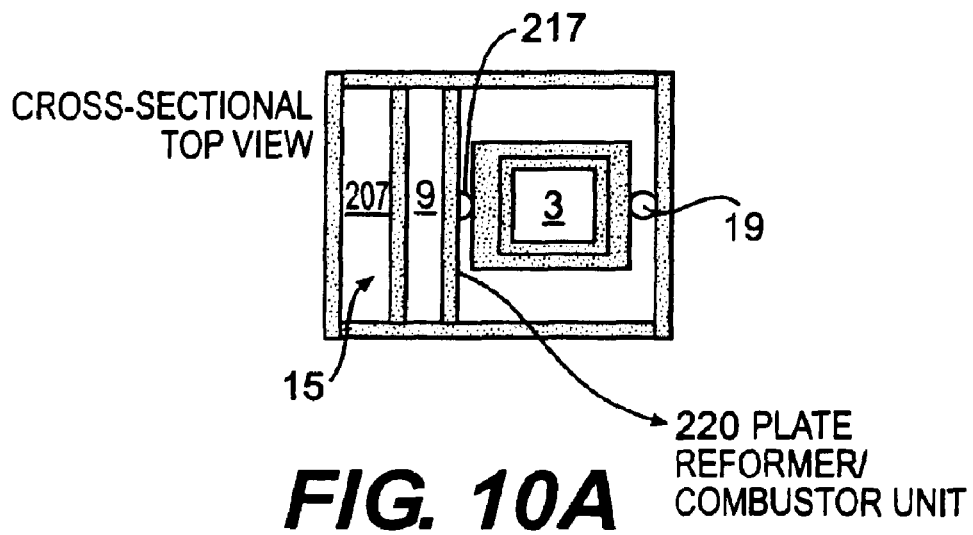
FIGS. 10A and 10B are schematics of integrated plate type reformer, combustor and stack unit for a single stack system.

The reformer 9 and combustor 15 unit can be of cylindrical type, as shown in FIG. 8A or plate type as shown in FIGS. 9A and 10A. The plate type unit provides more surface area for heat transfer while the cylindrical type unit is cheaper to manufacture.

Preferably, the reformer 9 and combustor 15 are integrated into the same enclosure and more preferably share at least one wall, as shown in FIGS. 8-10. Preferably, but not necessarily, the reformer 9 and combustor 15 are thermally integrated with the stack(s) 3, and may be located in the same enclosure, but comprise separate vessels from the stack(s) 3 (i.e., external reformer configuration).

In a preferred configuration of the system 201, fins 209 are provided in the stack cathode exhaust conduit 203 and in the burner 15 combustion zone 207 to assist with convective heat transfer to the reformer 9. In case where the reformer 9 shares one or more walls with the cathode exhaust conduit 203 and/or with the combustion zone 207 of the burner 15, then the fins are provided on the external surfaces of the wall(s) of the reformer. In other words, in this case, the reformer 9 is provided with exterior fins 209 to assist convective heat transfer to the interior of the reformer 9.

Figure 8B:
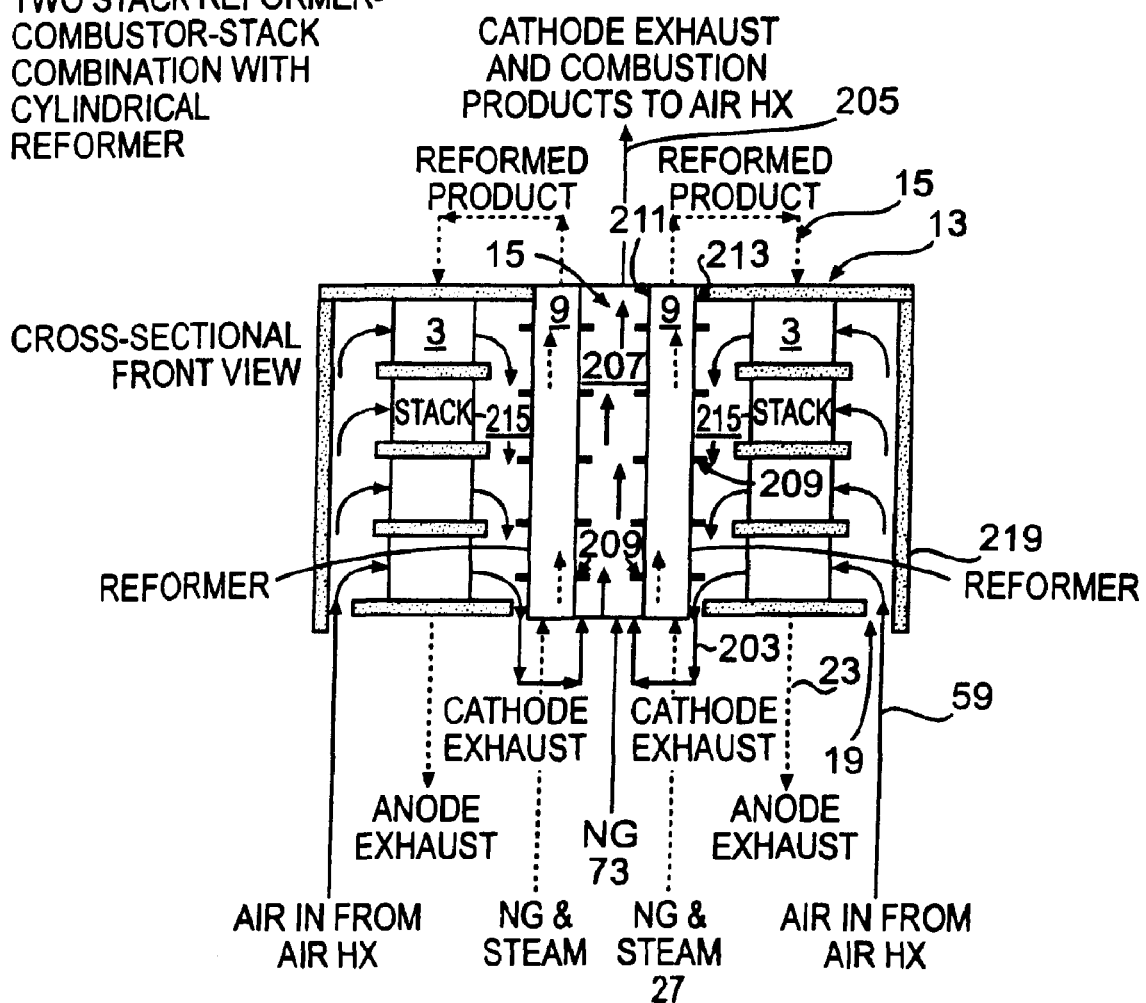

FIGS. 8A and 8B show the cross-sectional top and front views, respectively, of an assembly containing two stacks 3 and a cylindrical reformer 9 combustor 15 unit 210. The combustion zone 207 of the combustor 15 is located in the core of the cylindrical reformer 9. In other words, the combustor 15 comprises a catalyst containing channel bounded by the inner wall 211 of the reformer 9. In this configuration, the combustion zone 207 is also the channel for the cathode exhaust gas. The space 215 between the stacks 3 and the outer wall 213 of the reformer 9 comprises the upper portion of the stack cathode exhaust conduit 203. Thus, the reformer inner wall 211 is the outer wall of the combustor 15 and the reformer outer wall 213 is the inner wall of the upper portion of stack cathode exhaust conduit 203. If desired, a cathode exhaust opening 217 can be located in the enclosure 219 to connect the upper portion 215 of conduit 203 with the lower portions of the conduit 203. The enclosure 219 may comprise any suitable container and preferably comprises a thermally insulating material.

In operation, a natural gas (and/or other hydrocarbon fuel) and steam mixture is fed to the lower end of the reformer 9 through conduit 27. The reformed product is provided from the reformer 9 into the stack anode (fuel) inlet 13 through conduit 53. The spent fuel is exhausted from the stack through the anode exhaust 23 and conduit 31.

The air enters the stack through the cathode (air) inlet 19 and exits through exhaust opening 217. The system 201 is preferably configured such that the cathode exhaust (i.e., hot air) exists on the same side of the system as the inlet of the reformer 9. For example, as shown in FIG. 8B, since the mass flow of hot cathode exhaust is the maximum at the lower end of the device, it supplies the maximum heat where it is needed, at feed point of the reformer 9 (i.e., the lower portion of the reformer shown in FIG. 8B). In other words, the mass flow of the hot air exiting the stack is maximum adjacent to the lower portion of the reformer 9 where the most heat is needed. However, the cathode exhaust and reformer inlet may be provided in other locations in the system 201. The hot air containing cathode exhaust is preferably but not necessarily, provided into the combustion zone 207 of the combustor 15 through conduit 203.

Natural gas is also injected into the central combustion zone 207 of the combustor 15 where it mixes with the hot cathode exhaust. The circular or spiral fins are preferably attached to the inner 211 and outer 213 reformer walls to assist heat transfer. Heat is transferred to the outer wall 213 of the reformer 9 from the stack 3 by convection and radiation. Heat is transferred to the inner wall 211 of the reformer by convection and/or conduction from the combustion zone 207. As noted above, the reformer and combustion catalysts can either be coated on the walls or packed in respective flow channels.

Figure 9B:
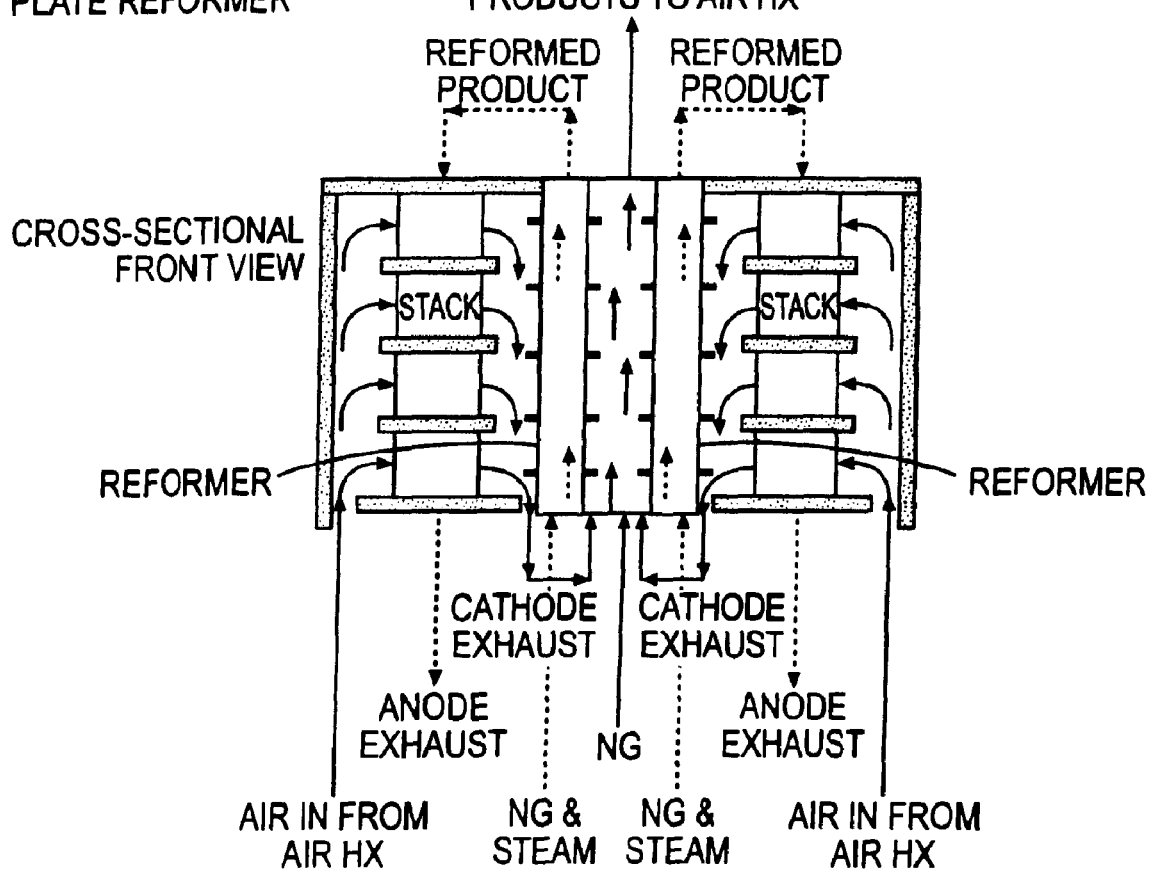

FIGS. 9A and 9B show the cross-sectional top and front views, respectively, of an assembly containing two stacks 3 and a plate type reformer 9 coupled with a plate type combustor 15. The configuration of the plate type reformer-combustor unit 220 is the same as the cylindrical reformer-combustor unit 210 shown in FIGS. 8A and 8B, except that the reformer-combustor unit 220 is sandwich shaped between the stacks. In other words, the combustion zone 207 is a channel having a rectangular cross sectional shape which is located between two reformer 9 portions. The reformer 9 portions comprise channels having a rectangular cross sectional shape. The fins 209 are preferably located on inner 211 and outer 213 walls of the reformer 9 portions. The plate type reformer and combustion unit 220 provides more surface area for heat transfer compared to the cylindrical unit 210 and also provides a larger cross-sectional area for the exhaust gas to pass through.

Figure 10B:
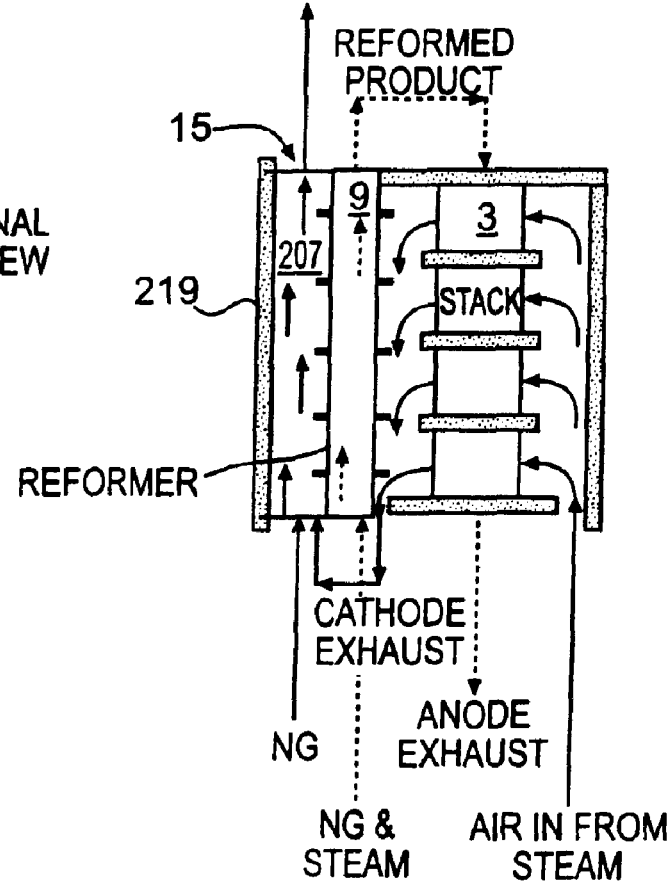

FIGS. 10A and 10B show the cross-sectional top and front views, respectively, of an assembly containing one stack 3 and a plate type reformer 9 coupled with a plate type combustor 15. Exhaust gas is wrapped around the reformer 9 from one side. One side of the combustion zone 207 channel faces insulation 219 while the other side faces the reformer 9 inner wall 213.

VII. Seventh Embodiment

Hot box 108 components, such as the stack 3 and reformer 9 are heated to a high temperature before starting (i.e., during the start-up mode) to draw current from the stack as well as produce hydrogen. Furthermore, the stack is preferably run in a reducing environment or ambient using hydrogen until the stack heats up to a reasonably high temperature below the steady state operating temperature to avoid reoxidation of the anode electrodes. Stored hydrogen can be used for this process. However, in the seventh preferred embodiment, a small CPDX (catalytic partial oxidation) unit is used in the start-up mode of the system, to make the system independent of external source of hydrogen.

Figure 7:
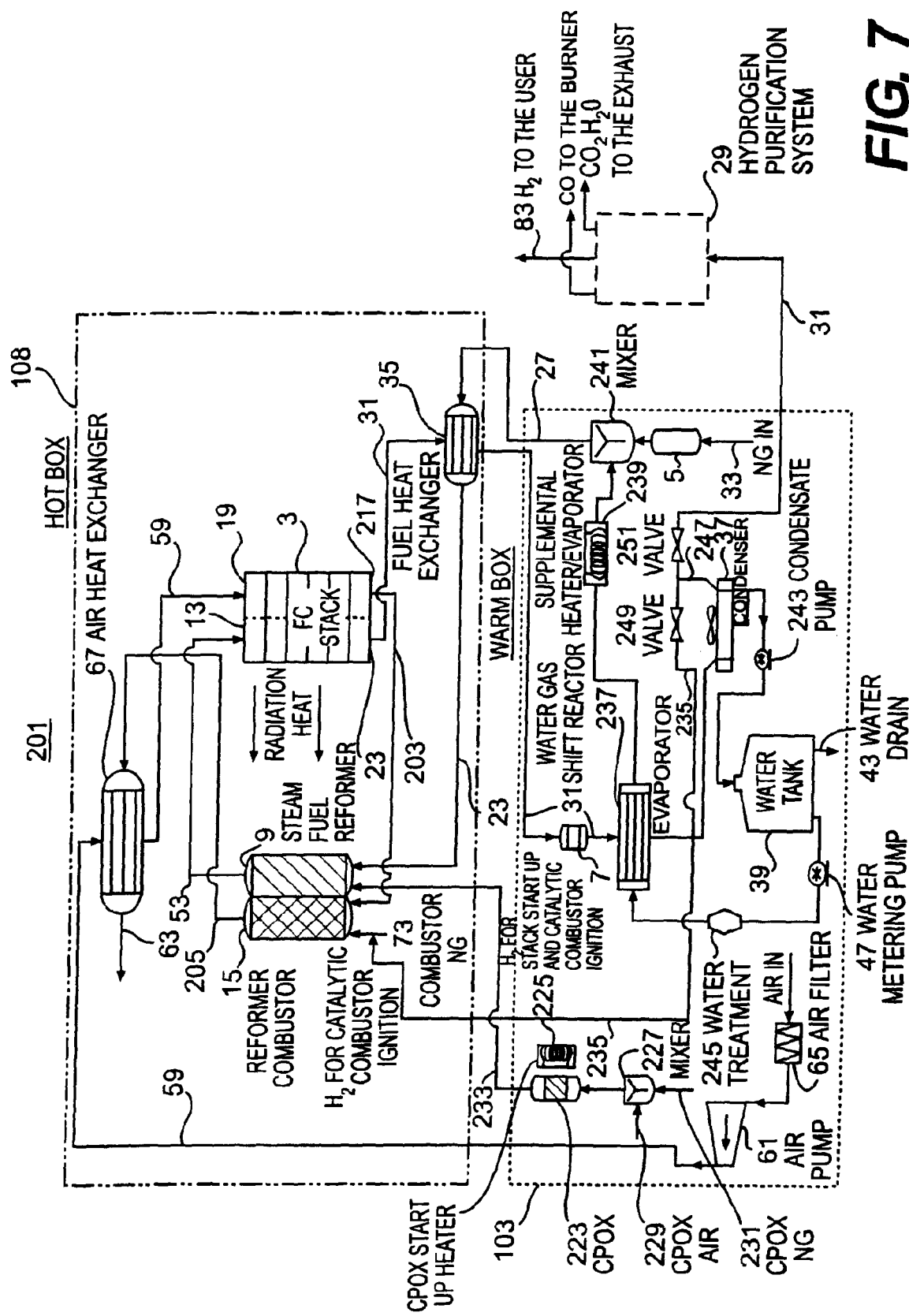

FIG. 7 illustrates the system 201 containing the CPDX unit 223. Any suitable CPDX device may be used. However, it should be noted that the CPDX unit may be used during start-up of other suitable SOFC systems, such as systems 1 and 101 shown in FIGS. 1 and 2, respectively.

The system 201 preferably also includes a start-up heater 225 for heating the CPDX unit 223 during start-up and a mixer 227 for mixing air and a hydrocarbon fuel, such as methane or methane containing natural gas. The air and fuel are provided into the mixer through conduits 229 and 231, respectively. The mixed air and fuel are provided into the CPDX unit 223 after being mixed in the mixer 227.

The CPDX unit 223 produces hydrogen from the air and fuel mix. The produced hydrogen is sent with excess oxygen and nitrogen through conduit 233 to the reformer 9. The hydrogen passes through the reformer 9, the stack 3, the fuel heat exchanger 35, the shift reactor 7 and the condenser unit 37 and is provided to the combustor 15 through conduit 235. The hydrogen is burned in the combustor 15 to heat up the reformer 9 and stack 15. This process is continued until the system heats up to a certain temperature, such as a temperature at which oxidation of the anode electrodes is avoided. Then the CPDX unit 223 is stopped or turned off, and a hydrocarbon fuel, such as natural gas, is injected directly into the combustor 15 through conduit 73 to continue the heating process. The combustor 15 is thermally integrated with the reformer 9 and can be used during the start-up and during steady state operation modes.

VIII. Eighth Embodiment

FIG. 7 illustrates the system 201 with components configured for efficient water management. However, it should be noted that the below described components may also be configured for efficient water management for other suitable SOFC systems, such as systems 1 and 101 shown in FIGS. 1 and 2, respectively.

A SOFC system in general can be self sufficient in water. Heat is required to make steam required for the methane reformation. Water from anode exhaust may be condensed and recycled back to the system. Furthermore, water and natural gas may be fed to a heat exchanger for transferring heat from the anode exhaust. However, under some operating conditions, the heat recovered from anode exhaust gas may not be sufficient to evaporate all the water needed in the reformation reaction as well as to heat the fuel inlet steam mixture to a desired temperature before feeding this mixture to the reformer. Thus, additional water heating and management components may be added to the system 201 to evaporate all the water needed in the reformation reaction as well as to heat the fuel inlet steam mixture to a desired temperature before feeding this mixture to the reformer.

The system 201 shown in FIG. 7 contains an additional evaporator 237, an optional supplemental heater/evaporator 239 and a steam/fuel mixer 241. The system operates as follows. The process of steam generation, mixing steam with fuel, such as natural gas, and preheating mixture may be done in four steps.

First, metered water is provided from the condenser 37 through condensate pump 243, water knockout/tank 39, metering pump 47 and optional water treatment device 245 into the evaporator 237. The metered water is heated and at least partially evaporated in the evaporator 237 by the heat from the anode exhaust provided into evaporator from the shift reactor 7 through conduit 31.

Second, the partially evaporated water is provided from evaporator 237 into the supplemental heater/evaporator 239. Supplemental heat is supplied in the heater/evaporator 239 to complete the evaporation process and superheat the steam.

Third, the steam is provided from the heater/evaporator 239 into the steam/fuel mixer 241. The steam is mixed with the fuel in the mixer.

Fourth, the fuel and steam mix is provided from the mixer 241 into the fuel heat exchanger 35, where the mix is preheated using heat from the hot anode exhaust. The fuel and steam mix is then provided into the reformer through conduit 27.

Water vapor transfer devices such as enthalpy wheels can be added to the system to reduce the heat required for the total evaporation process. These devices can transfer water vapor from the anode exhaust to incoming fuel stream.

As described above, the anode exhaust provided into the condenser 37 is separated into water and hydrogen. The hydrogen is provided from the condenser 37 via conduit 247 into the conduit 31 leading to the hydrogen purification subsystem 29 and into conduit 235 leading into the combustor 15. The flow of hydrogen from condenser 37 through conduits 31 and 235 may be controlled by one three way valve or by separate valves 249 and 251 located in conduits 31 and 235, respectively. The hydrogen from the hydrogen purification system 29 may be provided to the use/storage subsystem 115 via conduit 83, while the carbon monoxide from subsystem 29 is provided to the burner or combustor 15 and carbon monoxide and water from subsystem 29 are exhausted.

IX. Electricity and Hydrogen Generation

The electrochemical (i.e., high temperature fuel cell) system of the preferred embodiments of the present invention such as the solid oxide electrochemical system, such as a SOFC or a SORFC system, or the molten carbonate fuel cell system, can be used to co-produce hydrogen and electricity in the fuel cell mode. Thus, while the prior art SORFC system can generate either electricity in the fuel cell mode or hydrogen in an electrolysis mode, the system of the preferred embodiments of the present invention can co-produce both hydrogen and electricity (i.e., produce hydrogen and electricity together). The system of the preferred embodiments generates a hydrogen rich exhaust stream using reforming reactions that occur within the fuel cell stack and/or in a reformer in thermal integration with the fuel cell stack. The amount of hydrogen produced can be controlled by the operator. The hydrogen rich stream is further conditioned if necessary and stored or used directly by the operator. Thus, the high temperature electrochemical systems produce purified hydrogen as a by-product of fuel reformation in the fuel cell mode. The electrochemical system may operate in the fuel cell mode, when no external electricity input is required, to generate diffusion of ions across an electrolyte of the system. In contrast, a reversible or regenerative electrochemical system operates in the electrolysis mode when external electricity is required to generate diffusion of ions across the electrolyte of the system.

It should be noted that the electrochemical system of the preferred embodiments does not necessarily co-produce or co-generate power or electricity for use outside the system. The system may be operated to primarily internally reform a carbon and hydrogen containing fuel into hydrogen with minimal power generation or without delivering or outputting power from the system at all. If desired, a small amount of power may be generated and used internally within the system, such as to keep the system at operating temperature and to power system components in addition to other parasitic loads in the system.

Thus, in one aspect of the preferred embodiments of the present invention, the high temperature electrochemical system is a SOFC or a SORFC system which co-produces electricity and hydrogen in the fuel cell mode. A SOFC or SORFC system operates in the fuel cell mode when oxygen ions diffuse through an electrolyte of the fuel cells from the oxidizer side to the fuel side of the fuel cell containing the carbon and hydrogen containing gas stream. Thus, when the high temperature electrochemical system, such as a SOFC or SORFC system operates in the fuel cell mode to generate hydrogen, a separate electrolyzer unit operating in electrolysis mode and which is operatively connected to the fuel cell stack is not required for generation of hydrogen. Instead, the hydrogen is separated directly from the fuel cell stack fuel side exhaust gas stream without using additional electricity to operate a separate electrolyzer unit.

When an SORFC system is used rather than an SOFC system, the SORFC system can be connected to a primary source of electricity (e.g., grid power) and can accept electricity from the primary source when desirable or can deliver electricity to the primary source when desirable. Thus, when operating the SORFC system of the preferred embodiments, the system operator does not have to sacrifice electricity production to produce hydrogen and vice versa. The SORFC system does not require a hot thermal mass which absorbs heat in the fuel cell mode and which releases heat in the electrolysis mode for operation or energy storage. However, a hot thermal mass may be used if desired. Furthermore, the system may use, but does not require a fuel reformer.

Furthermore, a relative amount of hydrogen and electricity produced can be freely controlled. All or a portion of the hydrogen in the fuel side exhaust stream may be recirculated into the fuel inlet stream to provide control of the amount of electricity and hydrogen being co-produced in the system, as will be described in more detail below. The hydrogen product can be further conditioned, if necessary, and stored or used directly in a variety of applications, such as transportation, power generation, cooling, hydrogenation reactions, or semiconductor manufacture, either in a pressurized or a near ambient state.

The system 1 or 101 shown in FIGS. 1 and 2 derives power from the oxidation of a carbon and hydrogen containing fuel, such as a hydrocarbon fuel, such as methane, natural gas which contains methane with hydrogen and other gases, propane or other biogas, or a mixture of a carbon fuel, such as carbon monoxide, oxygenated carbon containing gas, such as methanol, or other carbon containing gas with a hydrogen containing gas, such as water vapor, $H_2$ gas or their mixtures. For example, the mixture may comprise syngas derived from coal or natural gas reformation. Free hydrogen is carried in several of the system process flow streams. The carbon containing fuel is provided into the system from a fuel source, which may comprise a fuel inlet into the fuel cell stack, a fuel supply conduit and/or a fuel storage vessel.

The fuel cell stack 3 preferably contains the fuel cells, separator plates, seals, gas conduits, heaters, thermal insulation, control electronics and various other suitable elements used in fuel cell stacks.

The system 1, 101 and 201 also contains at least one hydrogen separator, such as the PSA hydrogen separation device 29. The system 1, 101 and 201 also contains an optional hydrogen conditioner 114, as shown in FIGS. 1 and 2. The hydrogen conditioner 114 may be any suitable device which can purify, dry, compress (i.e., a compressor), or otherwise change the state point of the hydrogen-rich gas stream provided from the hydrogen separator 29. If desired, the hydrogen conditioner 114 may be omitted.

The system 1, 101 and 201 also contains a hydrogen storage/use subsystem 115, as shown in FIG. 2. This subsystem 115 may comprise a hydrogen storage vessel, such as a hydrogen storage tank, a hydrogen dispenser, such as a conduit which provides hydrogen or a hydrogen-rich stream to a device which uses hydrogen, or a hydrogen using device. For example, the subsystem 115 may comprise a conduit leading to a hydrogen using device or the hydrogen using device itself, used in transportation, power generation, cooling, hydrogenation reactions, or semiconductor manufacture.

For example, the system 1, 101 and 201 may be located in a chemical or a semiconductor plant to provide primary or secondary (i.e., backup) power for the plant as well as hydrogen for use in hydrogenation (i.e., passivation of semiconductor device) or other chemical reactions which require hydrogen that are carried out in the plant.

Alternatively, the subsystem 115 may also comprise another fuel cell, such as an SOFC or SORFC or any other fuel cell, which uses hydrogen as a fuel. Thus, the hydrogen from the system 1, 101 and 201 is provided as fuel to one or more additional fuel cells 115. For example, the system 1, 101 and 201 may be located in a stationary location, such as a building or an area outside or below a building and is used to provide power to the building. The additional fuel cells 115 may be located in vehicles located in a garage or a parking area adjacent to the stationary location. In this case, the carbon and hydrogen containing fuel is provided to the system 1, 101 and 201 to generate electricity for the building and to generate hydrogen which is provided as fuel to the fuel cell 115 powered vehicles. The generated hydrogen may be stored temporarily in a storage vessel and then provided from the storage vessel to the vehicle fuel cells 115 on demand (analogous to a gas station) or the generated hydrogen may be provided directly from the system 1, 101 and 201 to the vehicle fuel cells 115.

In one preferred aspect of the present invention, the hydrogen separator 29 is used to separate and route hydrogen from the fuel side exhaust stream only into the subsystem 115. In another preferred aspect of the present invention, the hydrogen separator 29 is used to separate hydrogen from the fuel side exhaust stream and to route all or a part of the hydrogen back into the fuel inlet 13 of the fuel cell stack 3 through conduit 81, to route all or part of the hydrogen to the subsystem 115 and/or to route the hydrogen out with the tail gas.

A preferred method of operating the systems 1, 101 and 201 will now be described. The systems are preferably operated so that excess fuel is provided to the fuel cell stack 3. Any suitable carbon containing and hydrogen containing fuel is provided into the fuel cell stack. The fuel may comprise a fuel such as a hydrocarbon fuel, such as methane, natural gas which contains methane with hydrogen and other gases, propane or other biogas. Preferably, an unreformed hydrocarbon fuel from the by-pass valve 11 and a hydrogen fuel from the reformer 9 are provided into the stack 3.

Alternatively, the fuel may comprise a mixture of a non-hydrocarbon carbon containing gas, such as carbon monoxide, carbon dioxide, oxygenated carbon containing gas such as methanol or other carbon containing gas with a hydrogen containing gas, such a water vapor or hydrogen gas, for example the mixture may comprise syngas derived from coal or natural gas reformation. The hydrogen and water vapor may be recycled from the fuel side exhaust gas stream or provided from hydrogen and water vapor conduits or storage vessels.

The reformation reactions occur within the fuel cell stack 3 and/or in the reformer 9 and result in the formation of free hydrogen in the fuel side exhaust gas stream. For example, if a hydrocarbon gas such as methane is used as a fuel, then the methane is reformed to form a mixture containing non-utilized hydrogen, carbon dioxide and water vapor in the fuel cell stack 3. If natural gas is used as a fuel, then the natural gas may be converted to methane in a preprocessing subsystem or it may be reformed directly to a non-hydrocarbon carbon containing gas such as carbon monoxide in the reformer 9.

Preferably, the fraction of hydrogen separated by the hydrogen separator 29 and the amount of total fuel provided to the fuel cell stack 3 for electricity and hydrogen production are variable and under the control of an operator operating a control unit of the system. An operator may be a human operator who controls the hydrogen separation and electricity production or a computer which automatically adjusts the amount of hydrogen separation and electricity production based on predetermined criteria, such as time, and/or based on received outside data or request, such as a demand for electricity by the power grid and/or a demand for hydrogen by the subsystem 115. Controlling these two parameters allows the operator to specify largely independently the amount of hydrogen produced and the amount of electricity generated.

The outside data or request may comprise one or more of electricity demand, hydrogen demand, electricity price and hydrogen price, which may be transmitted electronically to a computer system operator or visually or audibly to a human system operator.

In one extreme, when the user of the system needs electricity, but does not need additional hydrogen, then the operator can choose to have the hydrogen containing streams recirculated back into the fuel cell stack 3 by the separator 29 through conduit 81 by opening valve 79, while providing no hydrogen or a minimum amount of hydrogen to the subsystem 115, through conduit 83, where hydrogen flow may also be controlled by a valve.

In another extreme, when the user of the system needs hydrogen, but does not need any electricity generated, the operator can choose to have the fuel cell stack 3 act primarily to internally reform the carbon containing fuel into hydrogen with minimal power generation and/or minimal or no external power output/delivery from the system. A small amount of power may be generated to keep the system at operating temperature and to power the hydrogen separator 29 and conditioner 114, if necessary, in addition to other parasitic loads in the system. All or most of the hydrogen from the separator 29 is provided to the subsystem 115 rather than to the conduit 81. In this case, additional water from the water supply 39 is preferably added to the fuel.

In the continuum between the two extremes, varying amounts of hydrogen and electricity may be needed simultaneously. In this case, the operator can choose to divert varying amounts of the hydrogen from the separator 29 to conduits 81 and 83, while simultaneously generating the desired amount of electricity. For example, if more hydrogen is recirculated back into the fuel cell stack 3 through conduit 81 by controlling valve 79, then more electricity is generated but less hydrogen is available for use or storage in the subsystem 115. The trade off between the amount of electricity and hydrogen produced can vary based on the demand and the price of each.

The trade off between the amount of electricity and hydrogen generated may also be achieved using several other methods. In one method, the amount of fuel provided to the fuel cell stack 3 is kept constant, but the amount of current drawn from the stack 3 is varied. If the amount of current drawn is decreased, then the amount of hydrogen provided to the hydrogen separator 29 is increased, and vice versa. When less current is drawn, less oxygen diffuses through the electrolyte of the fuel cell. Since the reactions which produce free hydrogen (i.e., the steam-methane reforming reaction (if methane is used as a fuel) and the water-gas shift reaction) are substantially independent of the electrochemical reaction, the decreased amount of diffused oxygen generally does not substantially decrease the amount of free hydrogen provided in the fuel side exhaust gas stream.

In an alternative method, the amount of current drawn from the stack is kept constant, but the amount of fuel provided to the stack 3 is varied. If the amount of fuel provided to the stack 3 is increased, then the amount of hydrogen provided to the hydrogen separator 29 is increased, and vice versa. The amount of fuel may be varied by controlling the flow of fuel through the fuel inlet conduit 27 by a computer or operator controlled valve 28 and/or by controlling the flow of fuel through the by-pass line 11 by valve 55.

In another alternative method, both the amount of current drawn and the amount of fuel provided into the fuel cell stack 3 are varied. The amount of hydrogen generated generally increases with decreasing amounts of drawn current and with increasing amounts of fuel provided into the fuel cell stack. The amount of hydrogen generated generally decreases with increasing amounts of drawn current and with decreasing amounts of fuel provided into the fuel cell stack.

Preferably, the systems of the preferred embodiments may be operated at any suitable fuel utilization rate. Thus, 0 to 100 percent of the fuel may be utilized for electricity production. Preferably, 50 to 80 percent of the fuel is utilized for electricity production and at least 10 percent, such as 20 to 50 percent, of the fuel is utilized for hydrogen production. For example, a 100 kWe SOFC system may be used to generate from about 70 to about 110 kWe of electricity and from about 45 to about 110 kg/day of high pressure hydrogen when 50 to 80 percent of the fuel is utilized for electricity production. The systems of the preferred embodiments may be used to produce hydrogen cost effectively. Thus, the method of the preferred embodiments provides a reduction in the cost of hydrogen production.

If the fuel cell stack 3 is a solid oxide regenerative fuel cell (SORFC) stack which is connected to a primary source of power (such as a power grid) and a source of oxidized fuel (such as water, with or without carbon dioxide), then the device can operate transiently in an electrolysis mode as an electrolyzer to generate hydrogen streams, methane streams, or mixtures when economically advantageous (e.g., when the cost of electricity is inexpensive compared to the cost of the fuel containing bound hydrogen), or during times when the demand for hydrogen significantly exceeds the demand for electricity. At other times, the system 1, 101 and 201 can be used in the fuel cell mode to generate electricity from the stored hydrogen or carbon containing fuel. Thus, the system 1, 101 and 201 can be used for peak shaving.

The fuel cell systems described herein may have other embodiments and configurations, as desired. Other components, such as fuel side exhaust stream condensers, heat exchangers, heat-driven heat pumps, turbines, additional gas separation devices, hydrogen separators which separate hydrogen from the fuel exhaust and provide hydrogen for external use, fuel preprocessing subsystems, fuel reformers and/or water-gas shift reactors, may be added if desired, as described, for example, in U.S. application Ser. No. 10/300,021, filed on Nov. 20, 2002, in U.S. Provisional Application Ser. No. 60/461,190, filed on Apr. 9, 2003, and in U.S. application Ser. No. 10/446,704, filed on May 29, 2003 all incorporated herein by reference in their entirety. Furthermore, it should be understood that any system element or method step described in any embodiment and/or illustrated in any figure herein may also be used in systems and/or methods of other suitable embodiments described above, even if such use is not expressly described.

The foregoing description of the invention has been presented for purposes of illustration and description. It is not intended to be exhaustive or to limit the invention to the precise form disclosed, and modifications and variations are possible in light of the above teachings or may be acquired from practice of the invention. The description was chosen in order to explain the principles of the invention and its practical application. It is intended that the scope of the invention be defined by the claims appended hereto, and their equivalents.

What is claimed is:

1. A solid oxide fuel cell system, comprising:
  a plurality of solid oxide fuel cell stacks;
  a first means for reforming a hydrocarbon fuel to a hydrogen containing reaction product and for providing the reaction product to the stacks; and
  a second means for heating the first means, wherein the first means surrounds the second means and is thermally integrated with the second means, and wherein the first means is further heated by a cathode exhaust of the stacks and at least one of radiative and convective heating from the stacks, wherein the plurality of solid oxide fuel cell stacks surround the first means and wherein at least one wall of the first means in combination with the stacks form a cathode exhaust conduit of the stacks.

2. The system of claim 1, wherein the cathode exhaust conduit of the stacks is thermally integrated with the first means and wherein the cathode conduit is adapted to heat the first means using the cathode exhaust of the stacks.

3. The system of claim 2, wherein a first portion of the cathode exhaust conduit comprises a space located between the stacks and the first means, into which space the cathode exhaust is provided from the stacks.

4. The system of claim 3, wherein the cathode exhaust conduit is connected to an inlet of the second means.

5. The system of claim 3, wherein the space between the first means and the stacks comprises the cathode exhaust conduit of the stacks.

6. The system of claim 5, wherein an outer wall of the first means contains fins which extend into the cathode exhaust conduit and an inner wall of the first means contains fins which extend into the second means.

7. The system of claim 1, wherein the second means comprises a combustor conduit and a combustion zone containing a combustor catalyst.

8. The system of claim 7, wherein the second means shares at least one wall with the first means.

9. The system of claim 8, wherein:
  the first means comprises a catalyst containing cylinder;
  the at least one wall of the first means facing at least one of the plurality of the solid oxide fuel cell stacks comprises an outer wall of the cylinder facing the plurality of solid oxide fuel cell stacks; and
  the combustor conduit comprises a catalyst containing tube located in the cylinder core and the combustor tube wall comprises an inner wall of the cylinder.

10. The system of claim 8, wherein:
  the first means comprises a plurality of catalyst containing plate shaped reformer portions, each of which shares one wall with a catalyst containing plate shaped combustor combustion zone;
  and the at least one wall of the first means facing at least one of the plurality of the solid oxide fuel cell stacks comprises a plurality of walls of the plurality of reformer portions facing the plurality of the solid oxide fuel cell stacks.

11. The system of claim 7, further comprising a third means for providing hydrogen into the second means during system start up.

12. The system of claim 7, further comprising an air heat exchanger, wherein an outlet of the second means is connected to a first inlet of the air heat exchanger, an air inlet conduit is connected to a second inlet of the air heat exchanger, and a first outlet of the air heat exchanger is connected to a cathode inlet of the stacks.

13. The system of claim 1, further comprising:
  a fourth means for separating water from a stack anode exhaust;
  a fifth means for evaporating water to be provided into a stack inlet fuel stream; and
  a sixth means for mixing the evaporated water and the stack inlet fuel stream.

14. The system of claim 1, further comprising:
  a desulfurizer fluidly connected to fuel inlets of the stacks; and a water-gas shift reactor fluidly connected to fuel outlets of the stacks;

wherein the desulfurizer and the water-gas shift reactor are thermally integrated with each other.

15. The system of claim 1, further comprising:

a connecting conduit connecting fuel inlets of the stacks with an outlet of the first means; and a hydrocarbon fuel inlet conduit connected to an inlet of the first means.

16. The system of claim 1, further comprising:

a hydrogen separation device fluidly connected to fuel outlets of the stacks;

a carbon monoxide separation device fluidly connected to the fuel outlets of the stacks;

a hydrocarbon fuel inlet conduit fluidly connected to fuel inlets of the stacks; and a carbon monoxide recycle conduit, whose inlet is fluidly connected to an outlet of the carbon monoxide separation device and whose outlet is fluidly connected to the fuel inlets of the stacks.

17. The system of claim 1, further comprising:

a PSA separation device fluidly connected to fuel outlets of the stacks; and a thermal output of the stacks in addition to the fuel outlets is thermally integrated with at least a first column of the PSA device.

18. The system of claim 1, wherein the first means, the second means, and the stacks are located in a hot box.

19. The system of claim 18, wherein:

the second means is located in a middle of the hot box; and the first means comprises a plurality of conduits which surround the second means.

* * * * *